US007200569B2

(12) United States Patent
Gallagher et al.

(10) Patent No.: US 7,200,569 B2
(45) Date of Patent: Apr. 3, 2007

(54) INTELLIGENT APPARATUS, SYSTEM AND METHOD FOR FINANCIAL DATA COMPUTATION AND ANALYSIS

(75) Inventors: Robert J. Gallagher, Colorado Springs, CO (US); Theresa O. Watson, Co. Spgs, CO (US); Natalie D. Milner-Upshaw, Fairburn, GA (US); Penny L. Arviso, Peyton, CO (US); Paul J. Kunzler, Colorado Springs, CO (US); Barry Schneiderman, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 302 days.

(21) Appl. No.: 09/995,318

(22) Filed: Nov. 26, 2001

(65) Prior Publication Data

US 2003/0101112 A1 May 29, 2003

(51) Int. Cl.
*G06F 17/22* (2006.01)
(52) U.S. Cl. .......................................... 705/31; 705/19
(58) Field of Classification Search ................... 705/31, 705/30, 19
See application file for complete search history.

(56) References Cited

U.S. PATENT DOCUMENTS

| 1,830 | A | * | 10/1840 | Petrimoulx et al. ............ 111/31 |
| 5,335,169 | A | * | 8/1994 | Chong .......................... 705/31 |
| 5,644,724 | A | | 7/1997 | Cretzler ........................ 395/219 |
| 5,774,872 | A | | 6/1998 | Golden et al. ................ 705/19 |
| 5,799,283 | A | | 8/1998 | Francisco et al. ............. 705/19 |
| 5,875,433 | A | | 2/1999 | Francisco et al. ............. 705/26 |
| 5,970,475 | A | * | 10/1999 | Barnes et al. .................. 705/27 |
| 5,970,481 | A | * | 10/1999 | Westerlage et al. .......... 705/417 |
| 6,003,016 | A | | 12/1999 | Hagemier ..................... 705/19 |
| 6,064,983 | A | | 5/2000 | Koehler ....................... 705/31 |
| 6,078,898 | A | | 6/2000 | Davis et al. .................. 705/19 |

(Continued)

FOREIGN PATENT DOCUMENTS

| JP | 57189265 A | * | 11/1982 |
| JP | 04279997 A | * | 10/1992 |

OTHER PUBLICATIONS

Vertex Announces the Integration of its Client/Server Sales/Use Tax Compliance Software With Oracle Applications, Mar. 13, 1996, PR Newswire, pp.: 313PHW005.*

(Continued)

*Primary Examiner*—F. Zeender

(57) ABSTRACT

This disclosure relates to a program controlled apparatus, system and method for identifying taxable financial transactions, collecting data based on the transactions and calculating any sales and/or use taxes due on the transactions. The apparatus comprises a first database having a directory of parameters identifying all domestic government authorities by zip code, geocode, and by jurisdiction name requiring payment of taxes. A second database is provided having a directory of parameters identifying the taxability of goods and/or services for each jurisdiction identified by zip code, geocode, and jurisdiction name in the first database. Also, a third database has a directory of parameters identifying all domestic sales, use and rental tax rates for each zip code, geocode and jurisdiction name. Finally, a server is utilized with programming for determining all taxes due on each transaction request input to the apparatus according to the directory parameters maintained by the first, second and third databases.

13 Claims, 11 Drawing Sheets

U.S. PATENT DOCUMENTS

| | | |
|---|---|---|
| 6,078,899 A | 6/2000 | Francisco et al. ............. 705/19 |
| 6,183,140 B1 | 2/2001 | Singer et al. ............... 395/231 |
| 6,202,052 B1 | 3/2001 | Miller ......................... 705/31 |
| 6,298,333 B1 | 10/2001 | Manzi et al. ................. 705/31 |
| 6,625,581 B1 | 9/2003 | Perkowski |

OTHER PUBLICATIONS

Dynamic Dueo: Taxware and IBM; Partners on the Commerce.Net, May 1, 1996, PR Newswire, pp.: 501NEW015.*

* cited by examiner even with robust automated sales/use tax processes, most corporations have a relatively small number of transactions that are either too complex, or the dollars too great (i.e., and the risk is too large) to leave the decision to an automated system. For these transactions, human intervention is required.

INTELLIGENT APPARATUS, SYSTEM AND METHOD FOR FINANCIAL DATA COMPUTATION AND ANALYSIS

BACKGROUND OF THE INVENTION

The present invention relates generally to data processing and, more particularly, to an intelligent apparatus and method for computation and analysis of tax-related data.

Domestic businesses having a nexus to one or many tax jurisdictions are required to charge sales and/or use tax on each sale of tangible personal property (and on certain enumerated taxable services) to end-user customers who cannot claim an exemption from the tax. In addition, domestic businesses must also pay the merchant, and/or accrue and self-report, the correct amount of sales and/or use tax on all table purchases of tangible personal property as well as some services. Typically, each business is required to (i) correctly calculate the measure of tax for each transaction, (ii) file a return with the authorities identifying the amount of revenue for the period, sales and/or use tax collected and accrued, plus any exemptions claimed, (iii) periodically remit the amount of taxes owed to the authorities, and (iv) defend audits undertaken by such authorities.

Traditional methods of preparing and reporting tax information to government authorities have essentially been manual. In particular, at the close of each reporting period, financial representatives of the merchants, e.g., accountants, would sit down with all the merchant's sales and other transactional data and manually calculate the amount of sales and/or use taxes owed. Selected forms, withholding tax payments, quarterly tax payments, checks and other paperwork often necessary for reporting taxes would then be sent to the authorities via "snail mail". Since this process is essentially manual and is usually based only on information provided by the merchant, the merchant often had control over what was disclosed to their representative and, ultimately, what was reported to the authorities. Consequently, this practice allowed those relatively unscrupulous merchants to avoid paying taxes on considerable portions of their sales and other commercial transactions.

As a manual process, this method of tax compliance has also been prone to human error, not only in the accuracy of data collected, but also in the computation of the taxes owed. In addition, tax remittance was frequently delayed due to documents being late or lost in the mail, or merchants simply forgetting or otherwise omitting to remit sales and other transactional data to the authorities. The merchant would then be penalized for the late or incorrect tax payment.

In this connection, with the advent of the computer, many businesses developed customized tax calculation systems in order to semi-automate the tax compliance process. While these systems have been useful, because businesses and their financial constructs vary widely, the software used often needed to be tailored not only to each trade, but also specific applications had to be created to meet the particular requirements of each business. This resulted in considerable expense as well as delay in servicing the business's software needs. To further automate the tax compliance process, it was often necessary to integrate the tax software solutions with other business software. This required further customization of software applications as well as that of interface and other programs needed for integrating system-wide applications. Moreover, these systems frequently required trained personnel for effective operation and proper system maintenance. Despite the automation, accounting staff were still required to monitor and review the accuracy of each tax calculation, and to prepare tax returns. This was especially true where the taxable transactions involved multiple tax jurisdictions, since traditional systems lacked the robust analytical capability necessary for multi-jurisdictional tax decisions.

Domestic businesses essentially have three sales and use tax responsibilities (a.k.a. tax compliance). First, they must apply the correct amount of sales/use tax to their trade sales. Second, they must pay sales/use tax to merchants and/or accrue and self-report sales/use tax on taxable purchases. Third, they must accrue and self-report sales and/or use tax on conversions of resale inventory to internal use and movements of tangible personal property between taxable jurisdiction.

While the first and third responsibilities have been handled effectively by conventional software and other practices, the obligation of paying merchants and accruing and self-reporting on taxable purchases has presented an ongoing challenge to businesses. In particular, there are numerous variables concerning how merchants apply the tax. The merchant, for instance, may charge the full rate of sales and/or use tax, or may charge the state rate only, leaving the purchaser to accrue and self-report the local use tax, or may charge no tax at all because the merchant is not registered for sales or use tax collection in the ship-to jurisdiction, or may misapply the tax based on a misunderstanding of the taxability of the products or services sold, or a misunderstanding of the taxability of the order. These variables, combined with the fact that not enough information is collected in most conventional transaction processing systems to use for a tax payment/accrual decision, creates considerable complexity. Hence, some portion of the analysis must be done manually.

Recent trends have been to automate procurement and transaction processing systems to achieve cost savings through greater efficiency. This trend has put pressure on corporate tax departments, for example, to find ways to automate the sales and use tax payment and accrual process. Even with robust automated sales/use tax processes, most corporations have a relatively small number of transactions that are either too complex, or the dollars too great (i.e., and the risk is too large) to leave the decision to an automated system. For these transactions, human intervention is required.

Accordingly, a tax computation system is desired that automatically and intelligently identifies and monitors taxable transactions, correctly calculates in real-time the taxes due on the transaction, and identifies and extracts any transactions which require human intervention.

SUMMARY OF THE INVENTION

According to one aspect of the present invention, a program controlled apparatus is provided for identifying taxable financial transactions, collecting data based on the transactions and calculating any taxes due on the transactions, the apparatus comprising:

a first database having a directory of parameters identifying all domestic taxing jurisidctions by zip code requiring payment of taxes;

a second database having a directory of parameters identifying the taxability of goods and/or services by each jurisdiction identified by zip code in the first database, through the use of commodity codes;

a third database having a directory of parameters identifying all domestic sales, use and rental tax rates for each zip code; and a server having programming for determining all taxes due on each transaction request input to the apparatus according to the directory parameters maintained by the first, second and third databases.

According to another aspect of the present invention, a program controlled apparatus is provided for identifying taxable financial transactions, collecting data based on the transactions and calculating any taxes due on the transactions, the apparatus comprising:

a first database having a directory of parameters identifying all domestic taxing jurisdictions by geocode requiring payment of taxes;

a second database having a directory of parameters identifying the taxability of goods and/or services by each jurisdiction identified by geocode in the first database, through the use of commodity codes;

a third database having a directory of parameters identifying all domestic sales, use and rental tax rates for each geocode; and a server having programming for determining all taxes due on each transaction request input to the apparatus according to the directory parameters maintained by the first, second and third databases.

According to another aspect of the present invention, a program controlled apparatus is provided for identifying taxable financial transactions, collecting data based on the transactions and calculating any taxes due on the transactions, the apparatus comprising:

a first database having a directory of parameters identifying all domestic taxing jurisdictions by jurisdiction name requiring payment of taxes;

a second database having a directory of parameters identifying the taxability of goods and/or services by each jurisdiction identified by jurisdiction name in the first database, through the use of commodity codes;

a third database having a directory of parameters identifying all domestic sales, use and rental tax rates for each jurisdiction name; and a server having programming for determining all taxes due on each transaction request input to the apparatus according to the directory parameters maintained by the first, second and third databases.

In accordance with a further aspect of the present invention is a method for identifying taxable financial transactions, collecting data based on the transactions and calculating any taxes due on the transactions, the method comprising the steps of:

inputting an XML-based transaction request from a selected transaction processing source system to a program controlled apparatus for performing tax related transactions;

searching lines of the transaction request to locate transactions with exempt taxability codes associated with each line of the transaction request and a taxpayer invoiced tax amount of zero;

searching lines of the transaction request to locate transactions where all ship-to locations are within jurisdictions which do not impose sales or use taxes, and a taxpayer invoiced taxed amount of zero;

searching lines of the transaction request to locate transactions containing a trusted general ledger account for each ship-to state;

parsing a list in selected database directory of the apparatus for trusted vendors of the ship-to-state to determine whether the taxpayer of the transaction request is a trusted vendor;

parsing a list in a selected database directory of the apparatus for must-see accounts, cost centers, taxpayers and tax codes to determine whether the account number, cost center, taxpayer and tax code input with the transaction request corresponds to a corresponding account number, cost center, taxpayer and tax code on the list;

parsing a list in a selected database directory of the apparatus to determine whether a tax rate corresponding to the tax amount invoiced matches an expected tax rate for the transaction request and is within a selected tolerance of error;

searching all lines of the transaction request to determine if the expected tax rate for each line of the transaction request is the full rate of tax for the corresponding ship-to address on the line, with a taxpayer invoiced tax amount equal to zero; transmitting the transaction request to a tax processor for reviewing the request and determining the amount of sales and/or use tax to be paid to the taxpayer and/or accrued; and recording in the general ledger system the tax paid to the taxpayer and/or accrued.

In accordance with a further aspect of the present invention is a method for identifying taxable financial transactions, collecting data based on the transactions and calculating any taxes due on the transactions, the method comprising the steps of:

inputting an XML-based transaction request from a selected transaction processing source system to a program controlled apparatus for performing tax related transactions;

searching lines of the transaction request to locate exempt taxability codes on all lines of the transaction request and a zero tax amount invoiced by the taxpayer, and if located, transmitting the transaction request to a general ledger system and recording the request with the same exempt taxability codes found in the transaction request in the general ledger system;

parsing a list in a selected database directory of jurisdictions which do not impose sales or use taxes;

searching lines of the transaction request to determine if all lines of the transaction request were shipped to jurisdictions which do not impose sales or use taxes, and if located, examining the tax amount field in the transaction request to determine if the tax amount is zero, and if this condition is also met, transmitting the transaction request to the general ledger system and recording the request with a selected tax code in the general ledger system;

parsing a list in a selected database directory of trusted general ledger accounts for each state;

searching the transaction request to determine whether each line of the transaction request contains trusted general ledger accounts, and if located, transmitting the transaction request to the general ledger system and recording the request with a selected tax code in the general ledger system;

parsing a list in selected database directory of the apparatus of trusted vendors for the ship-to-state to determine whether the taxpayer of the transaction request is a trusted vendor, and if located, transmitting the transaction request to the general ledger system and recording the request with a selected tax code in the general ledger system;

parsing a list in a selected database directory of the apparatus for must-see accounts, cost centers, taxpayers and tax codes to determine whether the account number, cost center, taxpayer and tax code input with the transaction request corresponds to a corresponding account number, cost center, taxpayer and tax code on the list, and if located, transmitting the transaction request to a tax processor for reviewing the request and determining the amount of sales/use tax to be paid to the taxpayer and/or accrued and self-reported;

recording in the general ledger system the sales/use tax paid to the taxpayer and/or accrued; parsing a list in a selected database directory of the apparatus to determine whether a tax rate corresponding to the tax amount invoiced matches an expected tax rate for the transaction request and is within a selected tolerance of error, and if located, transmitting the transaction request to the general ledger system and recording the request with a selected tax code in the general ledger system, and if not located, transmitting the transaction request to a tax processor for reviewing the request, determining the amount of sales/use tax to be paid to the taxpayer and/or accrued, and recording in the general ledger system the sales/use tax paid to the taxpayer and/or accrued; and searching lines of the transaction request to determine whether each line of the transaction request contains an expected tax rate equal to the full sales/use tax rate for the corresponding ship-to address on each line of the transaction request, with a taxpayer invoiced tax amount equal to zero, and if located, transmitting the transaction request for recording in the general ledger system with a selected tax code causing a full sales/use tax rate accrual for the ship-to location on each line of the transaction request.

According to another aspect of the present invention is a method for identifying taxable financial transactions, collecting data based on the transactions and calculating any taxes due on the transactions, the method comprising the steps of:

inputting an XML-based transaction request from a selected transaction processing source system to a program controlled apparatus for performing tax related transactions;

identifying the class of transaction to be processed;

determining the taxability of the transaction request based on a taxability indicator contained in the transaction request;

locating a tax rate in a selected database directory that is applicable to the item of goods being sold;

parsing a list in a selected database directory of vendors, by location, collecting tax in full;

matching the taxpayer in the transaction request with a vendor in the list;

writing to a selected file that no accrual of tax is due on the item; and completing processing of the transaction.

According to a further aspect of the present invention is a method for identifying taxable financial transactions, collecting data based on the transactions and calculating any taxes due on the transactions, the method comprising the steps of:

inputting an XML-based transaction request from a selected transaction processing source system to a program controlled apparatus for performing tax related transactions;

identifying the class of transaction to be processed;

determining the taxability of the transaction request based on a taxability indicator contained in the transaction request;

determining the taxability of the products/services purchased by parsing a list in a selected database directory of product/service taxability by location, and searching the list for each commodity code found in the transaction request;

parsing a list in a selected database directory of vendors, by location, collecting state level sales/use tax;

matching the taxpayer in the transaction request with a vendor in the list;

writing to a selected file that the transaction request is subject to local sales/use tax only; and completing processing of the transaction.

According to still another aspect of the present invention is a method for identifying taxable financial transactions, collecting data based on the transactions and calculating any taxes due on the transactions, the method comprising the steps of:

inputting an XML-based transaction request from a selected transaction processing source system to a program controlled apparatus for performing tax related transactions;

identifying the class of transaction to be processed;

determining whether the transaction request contains an exempt taxability code and whether any tax amount field in the request contains an amount greater than zero;

writing to a selected error log for obtaining taxpayer credit; and completing processing of the transaction.

According to yet another aspect of the present invention is a method for identifying taxable financial transactions, collecting data based on the transactions and calculating any taxes due on the transactions, the method comprising the steps of:

inputting an XML-based transaction request from a selected transaction processing source system to a program controlled apparatus for performing tax related transactions;

identifying the class of transaction to be processed;

determining whether the transaction request relates to a sale of an item of goods or a resale of the item of goods;

parsing a selected database directory for a tax rate that is applicable to the item of goods being resold; and completing processing of the transaction.

According to still a further aspect of the present invention is a method for identifying taxable financial transactions, collecting data based on the transactions and calculating any taxes due on the transactions, the method comprising the steps of:

inputting an XML-based transaction request from a selected transaction processing source system to a program controlled apparatus for performing tax related transactions;

identifying the class of transaction to be processed;

determining whether the transaction request relates to a sale of an item of goods or a resale of the item of goods;

locating a tax rate in a selected database directory that is applicable to the item of goods being sold;

parsing a list in a selected database directory of those items of goods that are tangible personal property;

searching the list for the item of goods;

writing to a selected file that no accrual of tax is due on the item; and completing processing of the transaction.

According to yet a further aspect of the present invention is a method for identifying taxable financial transactions, collecting data based on the transactions and calculating any taxes due on the transactions, the method comprising the steps of:

inputting an XML-based transaction request from a selected transaction processing source system to a program controlled apparatus for performing tax related transactions;

identifying the class of transaction to be processed;

determining whether the transaction request relates to a sale of an item of goods or a resale of the item of goods;

locating a tax rate in a selected database directory that is applicable to the item of goods being sold;

parsing a list in a selected database directory of those items of goods that are tangible personal property;

matching the item of goods with an item of goods in the list;

writing to a selected file that accrual of tax on the item is due in full; and completing processing of the transaction.

According to another aspect of the present invention is a method for identifying taxable financial transactions, collecting data based on the transactions and calculating any taxes due on the transactions, the method comprising the steps of:

inputting an XML-based transaction request from a selected transaction processing source system to a program controlled apparatus for performing tax related transactions;

identifying the class of transaction to be processed;

if the transaction is an electronic catalog purchase, then searching the transaction request for a taxability code, and determining whether the taxability code reflects that the purchase is for a taxable or a tax exempt purchase of goods and/or services, and if the taxability code reflects a code other than taxable, then the level 2 tax field in the transaction request is searched for a tax amount, and if located, transmitting the transaction request to the general ledger system and recording the request with the same exempt taxability code found in the transaction request in the general ledger system, and writing the transaction request to an error log for purposes of pursuing taxpayer credit, and if not located, then transmitting the transaction request to the general ledger system and recording the request with the same exempt taxability code found in the transaction request; and searching the transaction request for an expected tax rate greater than about 0.00%, and if located, then examining the level 2 tax field in the transaction request for an amount greater than about $0.00, and if located, then parsing a selected database directory containing taxpayer taxing locations, searching for the taxpayer contained in the transaction request, and if located, then determining whether the taxpayer collects the full sales/use tax rate for the ship-to location based on the coding found in the database directory, and if the taxpayer does collect the full rate of tax for the ship-to location, then transmitting the transaction request to the general ledger system and recording the request with a selected tax code in the general ledger system, and if the taxpayer is not listed as collecting tax in full for the ship-to location, then transmitting the transaction request to the general ledger system and recording the request with a selected tax code in the general ledger system causing an accrual of city, county and/or transit tax for the ship-to location contained in the transaction request, if directed by the coding in the selected database directory of taxpayer taxing locations, and if not located, then transmitting the transaction request to the general ledger system and recording the request with a selected tax code in the general ledger system causing a full rate sales/use tax accrual for the ship-to location contained in the transaction request, and if not located, then examining the level 2 tax field in the transaction request for an amount greater than about $0.00, and if located, then transmitting the transaction request to the general ledger system and recording the request with a selected tax code in the general ledger system, and writing the request to an error log for purposes of pursuing taxpayer credit, and if not located, then transmitting the transaction request to the general ledger system and recording the request with a selected tax code in the general ledger system.

In accordance with still another aspect of the present invention is a method for identifying taxable financial transactions, collecting data based on the transactions and calculating any taxes due on the transactions, the method comprising the steps of:

inputting an XML-based customer transaction request from a selected transaction processing source system to a program controlled apparatus for performing tax related transactions;

identifying the class of transaction to be processed;

if the transaction is a credit card purchase, then parsing a list in a first selected database directory of those credit card numbers to be denied access to the apparatus;

searching the list for the credit card number contained in the transaction request, and if located, then transmitting the transaction request to a selected file for future transmission to the general ledger system and recording the request with a selected tax code in the general ledger system;

parsing a list in a second selected database directory of taxing jurisdictions associated with cost-centers/departments;

searching the list for the state associated with the cost-center/department contained in the transaction request;

parsing a list in a third selected database directory of those jurisdictions not imposing sales or use taxes;

searching the list for the state associated with the cost-center/department, obtained from the second selected database directory, and if located, then transmitting the request to a selected file for future transmission to the general ledger system and recording the request with a selected tax code in the general ledger system;

parsing a list in a fourth selected database directory of taxpayer's taxing locations, and sale type;

searching the list for the taxpayer contained in the transaction request, and if found, and the taxpayer is a seller of services, then parsing a fifth selected database directory of jurisdictions applying sales and/or use taxes to services, searching for the state associated with the cost-center department contained in the transaction request, and if located, and the taxpayer is listed as collecting tax in full for the state associated with the cardholder's cost-center/department, then transmitting the request to a selected file for future transmission to the general ledger system and recording the request with a selected tax code in the general ledger system, and if located, and the taxpayer is not listed as collecting tax in full for the jurisdiction associated with the cardholder's cost-center/department, then searching the level 2 tax field in the transaction request for a tax amount, and if located, then transmitting the transaction request to a selected file for future transmission to the general ledger system and recording the request in the general ledger system with a selected tax code in the general ledger system causing an accrual of local sales or use tax for the taxing jurisdiction associated with the cardholder's cost-center/department, and recording the amount of sales and/or use tax paid to the taxpayer and locale sale or use tax amount accrued in the general ledger, and if no tax amount is found in the level 2 tax field in the transaction request, then transmitting the transaction request to a selected file for future transmission to the general ledger system and recording the request in the general ledger system with a selected tax code in the general ledger system causing a full rate sales/use tax accrual for the taxing jurisdiction associated with the cardholder's cost-center/department, and recording the amount of sales and/or use tax accrued on the transaction request in the general ledger system, and if not located, then transmitting the transaction request to a selected file for future transmission to the general ledger system and recording the request with a selected tax code in the general ledger system, and if the taxpayer is not a seller of services, and the fourth selected database directory of taxpayer taxing locations reveals that the taxpayer collects tax in full for the cardholder jurisdiction, then transmitting the transaction request to a selected file for future transmission to the general ledger system and recording the request with a selected tax code in the general ledger system;

if the fourth selected database directory of taxpayer taxing locations does not indicate that the taxpayer collects tax in full for the cardholder jurisdiction, and the tax amount in the level 2 tax field is greater than zero, then transmitting the transaction request to a selected file for future transmission to the general ledger system and recording the request with a selected tax code in the general ledger system causing an accrual of local sales or use tax for the taxing jurisdiction associated with the cardholder's cost-center/department in the general ledger system, and recording the amount of sales and/or use tax paid to the taxpayer and local sale or use tax amount accrued in the general ledger, and if no tax amount is located in the level 2 tax field, then transmitting the transaction request to a selected file for future transmission to the general ledger system and recording the request with the selected tax code in the general ledger system causing a full rate sale/use tax accrual for the taxing jurisdiction associated with the cardholder's cost-center/department, and recording the amount of sales and/or use tax accrued on the transaction request in the general ledger system;

parsing a list in a sixth selected database directory of taxpayer names who are identified as trusted;

searching the list for the taxpayer name found in the transaction request, and if located, then transmitting the transaction request to a selected file for future transmission to the general ledger system and recording the request with a selected tax code in the general ledger system;

determining whether the level 2 tax field contains an amount, and if located, transmitting the transaction request to a selected file for future transmission to the general ledger system and recording the request with a selected tax code in the general ledger system;

determining whether the jurisdiction associated with the cost-center/department is the same as the taxpayer jurisdiction, and if so, transmitting the transaction request to a selected file for future transmission to the general ledger system and recording the request with a selected tax code in the general ledger system, and if not, transmitting the transaction request to a selected file for future transmission to the general ledger system and recording the request in the general ledger system with a selected tax code in the general ledger system causing a full rate sale/use tax accrual for the taxing jurisdiction associated with the cardholder's cost-center/department, and then recording the amount of sales and/or use tax accrued on the transaction request in the general ledger system; and completing processing of the transaction.

In accordance with yet another aspect of the present invention is a method for identifying taxable financial transactions, collecting data based on the transactions and calculating any taxes due on the transactions, the method comprising the steps of:

inputting an XML-based customer transaction request from a selected transaction processing source system to a program controlled apparatus for performing tax related transactions;

identifying the class of transaction to be processed;

if the transaction is a credit card purchase, then parsing a list in a first selected database directory of those credit card numbers to be denied access to the apparatus;

searching the list for the credit card number contained in the transaction request, and if located, transmitting the transaction request to a selected file for future transmission to the general ledger system and recording the request with a selected tax code in the general ledger system;

parsing a list in a second selected database directory of trusted commodity codes;

searching the list for the commodity code contained in the transaction request, and if located, transmitting the transaction request to a selected file for future transmission to the general ledger system and recording the request with a selected tax code in the general ledger system;

determining whether the transaction request contains a taxability code other than the taxable code, and if the transaction request contains a taxability code other than taxable, then the tax field is searched for a tax amount, and if located, then transmitting the transaction request to a selected file for future transmission to the general ledger system and recording the request with a selected tax code in the general ledger, and writing the transaction request to an error log for purposes of pursuing taxpayer credit, and if not located, then transmitting the transaction request to a selected file for future transmission to the general ledger system and recording the request with a selected tax code in the general ledger;

parsing a list in a third selected database directory of those jurisdictions not imposing sales or use taxes;

searching the list for the jurisdiction associated with the ship-to jurisdiction contained in the transaction request, and if located, then transmitting the request to a selected file for future transmission to the general ledger system and recording the request with a selected tax code in the general ledger system;

determining whether the expected tax rate in the transaction request is about 0.00% and the tax amount field is about $0.00, and if this condition is met, then transmitting the transaction request to a selected file for future transmission to the general ledger system and recording the request with a selected tax code in the general ledger system;

determining whether the expected tax rate in the transaction request is greater than about 0.00% and the tax amount field in the transaction request is about $0.00, and if this condition is met, then transmitting the transaction request to a selected file for future transmission to the general ledger system and recording the request with a selected tax code in the general ledger system causing a full rate sale/use tax accrual for the ship-to taxing jurisdiction, and thereafter recording the amount of sales and/or use tax accrued on the transaction request in the general ledger system;

determining whether the expected tax rate in the transaction request is greater than about 0.00% and the tax amount field in the transaction request is greater than about $0.00, and if this condition is met, then parsing a fourth selected database directory, containing the taxability of separately-stated common carrier freight charges by jurisdiction, searching for the taxability of separately-stated common carrier freight charges for the ship-to jurisdiction contained in the transaction request, and when located, computing the tax amount due by the following formula: expected tax rate times the (total credit card charge minus the amount of the tax amount field, minus the amount in the separately-stated freight amount field if the entry in the fourth selected database directory indicates that the freight charge is non-taxable for the ship to jurisdiction), comparing the amount in the tax amount field to the computed tax amount due, and if the amount in the tax field matches the computed tax amount due within a selected tolerance of error, based in cents, then transmitting the transaction request to a selected file for future transmission to the general ledger system and recording the request with a selected tax code in the general ledger system, and if the amount in the tax amount field does not match the computed tax amount due within the selected tolerance of error, then parsing a fifth selected database directory, containing a list of locations requiring the accrual of local city, country and transit/district use taxes and a corresponding code for the type of local use tax accrual required for the jurisdiction, searching for the ship-to location contained in the transaction request, and if located, then transmitting the transaction request to a selected file for future transmission to the general ledger system and recording the request with a selected tax code in the general ledger system causing a city, county and/or transit/district use tax accrual, as specified by the coding found in the fifth selected database directory entry for the ship-to location in the transaction request, in the general ledger system, and recording the amount of sales and/or use tax paid to the taxpayer, plus the amount of city, county, and/or transit/district use tax accrued on the transaction request, in the general ledger system, and if not located, then transmitting the transaction request to a selected file for future transmission to the general ledger system and recording the request with a selected tax code in the general ledger system;

determining whether the expected tax rate in the transaction request equals about 0.00% and the tax field amount in the transaction request is greater than about $0.00, and if this condition is met, then transmitting the transaction request to a selected file for future transmission to the general ledger system, recording the request with a selected tax code in the general ledger, and writing the transaction request to an error log for purposes of pursuing taxpayer credit; and completing processing of the transaction.

In accordance with yet another aspect of the present invention is a method for identifying taxable financial transactions, collecting data based on the transactions and calculating any taxes due on the transactions, the method comprising the steps of:

inputting an XML-based customer transaction request from a selected transaction processing source system to a program controlled apparatus for performing a tax related transaction;

identifying the class of transaction to be processed;

if the transaction is a credit card purchase, then parsing a list in a first selected database directory of credit card holder locations;

searching the list for the credit card number contained in the transaction request;

determining whether the cardholder jurisdiction matches the taxpayer jurisdiction contained in the transaction request, and if located, writing to a selected file that no accrual of tax is due on the item; and completing processing of the transaction.

According to another aspect of the present invention is a method for identifying taxable financial transactions, collecting data based on the transactions and calculating any taxes due on the transactions, the method comprising the steps of:

inputting an XML-based customer transaction request from a selected transaction processing source system to a program controlled apparatus for performing tax related transactions;

identifying the class of transaction to be processed;

determining whether the transaction is for a selected number of items of goods or services;

parsing a list in a first selected database directory of those credit card numbers to be denied access to the apparatus;

searching the list for a credit card number input by the customer with the transaction request;

parsing a list in a second selected database directory of those jurisdictions having a service override status;

searching the list for a jurisdiction input by the customer with the transaction request, and if the jurisdiction input is not on the list, then completing processing of the transaction, and if the jurisdiction input is on the list, then parsing a list in a third selected database directory of those jurisdictions charging the full tax applicable to the sale of services, and searching the list for the jurisdiction input by the customer, and if the jurisdiction input is on the list, then writing to a selected file that no accrual of tax is due on the services, and if the jurisdiction input is not on the list and the applicable tax is zero, then writing to a selected file that accrual of taxes on the services is due in full, and if the jurisdiction input is not on the list and the applicable tax is not zero, then writing to a selected file that no accrual of taxes is due on the services, and parsing a list in a selected fourth database directory of those taxpayers subject to local tax accrual, and searching the list for the taxpayer input with the transaction request, and if the taxpayer is on the list, then writing to a selected file that accrual of local taxes due on the services, and if the taxpayer is not on the list, then writing to a selected file that no accrual of local taxes is due on the services, and completing processing of the transaction.

It is, therefore, an object of the present invention to provide an intelligent, automated apparatus and method for computation and analysis of tax-related data.

Another object of the present invention to provide an apparatus and method for computing the amount of taxes owed on a sale of goods or services for ready access by a selected financial institution.

A further object of the present invention is to provide an automated sales tax reporting and payment system for taxpayers or the like.

Still another object of the present invention is to provide an apparatus, a system and a method for determining the taxes owed and remitting the same over an interactive communications network so as to eliminate the need for manually filing a tax return.

Another object of the present invention is to provide seamless, error free, automated sales and/or tax processing services across multiple tax jurisdictions.

Yet a further object of the present invention is a tax computation system that automatically and intelligently identifies and monitors taxable transactions, correctly calculates in real-time the taxes due on the transaction, and extracts any taxable transactions which require human intervention.

Yet another object of the present invention is to provide an automated apparatus and method for satisfying the obligation of paying taxpayers and accruing and self-reporting on taxable purchases to government authorities, simply, efficiently and economically.

Still another object of the present invention is to improve the speed and quality of data transfer between merchants, financial institutions and government authorities.

Still a further object of the present invention is to enable merchants to electronically outsource the burden of sales and/or use tax calculation related to sales and accounts payable processes, and remittance of their accrued tax to state and local government tax authorities via state-certified service providers.

Another object of the present invention is to significantly reduce the internal information technology and accounting staff expenses of merchants by minimizing the need for human intervention in the sale and use tax computation process.

A further object of the present invention is to significantly overcome the complexities of the tax compliance process and gaps in data provided authorities access to complete transaction records electronically maintained by a tax service provider.

Still a further object of the present invention is to maximize automation of procurement and transaction processing systems and, thereby, achieve greater efficiency and cost savings without sacrificing accuracy of the sale and use tax computation process.

Yet a further object of the present invention is to provide an intelligent, automated apparatus, system and method for computing taxes owed on sales transactions and remitting the same over an interactive communications network, with minimal human intervention.

Another object of the present invention is to enable merchants to substantially shift the burden of sales and/or use tax calculation to an automated system.

The present invention will now be further described by reference to the following drawings which are not intended to limit the accompanying claims.

BRIEF DESCRIPTION OF THE DRAWINGS

The same numerals are used throughout the figure drawings to designate similar elements. Still other objects and advantages of the present invention will become apparent from the following description of the preferred embodiments.

DETAILED DESCRIPTION OF THE PREFERRED EMBODIMENTS

Figure 1:
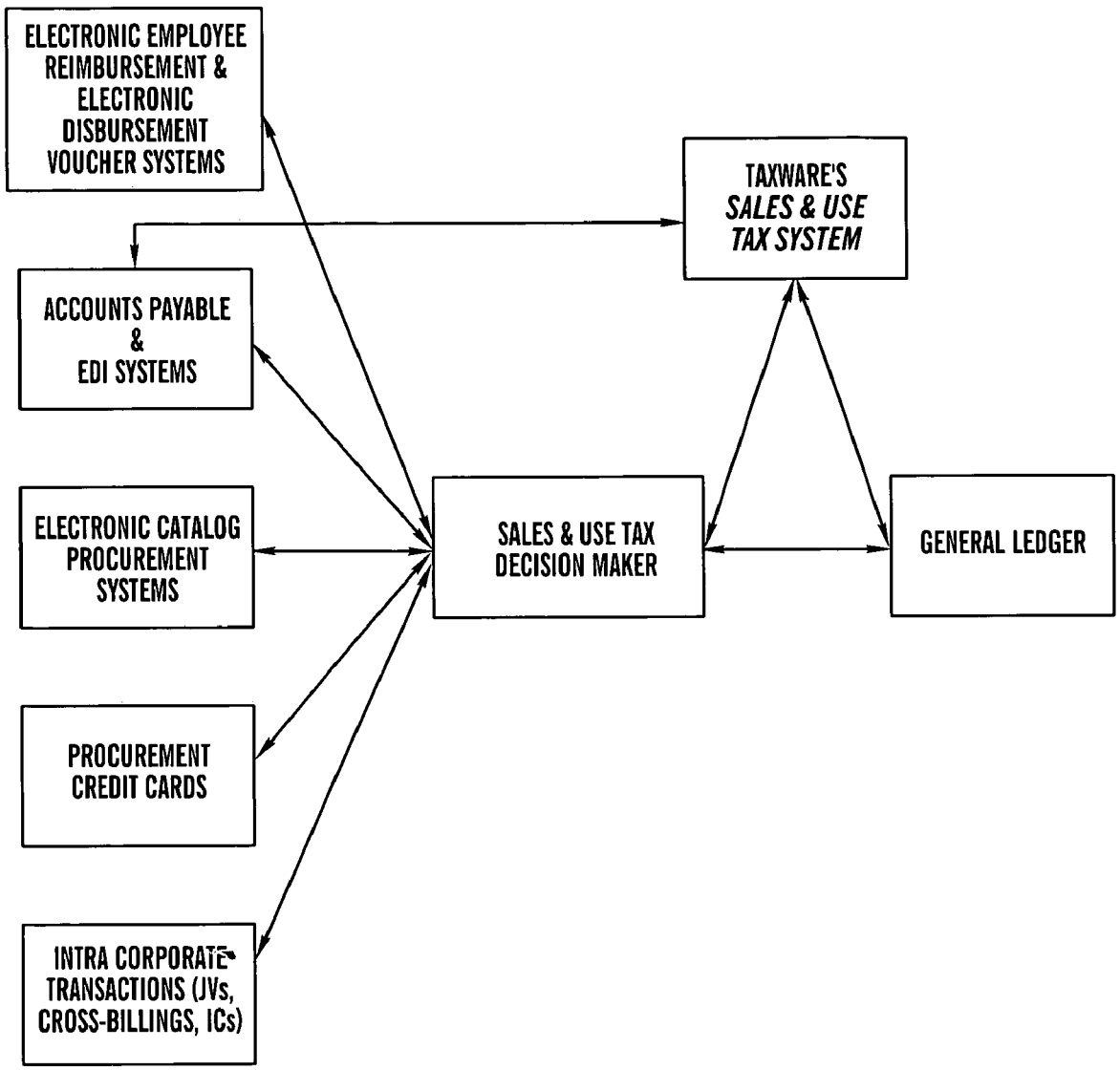
FIG. 1 is a flow diagram of a sales and use tax computation system, according to one aspect of the present invention.
Figure 2:
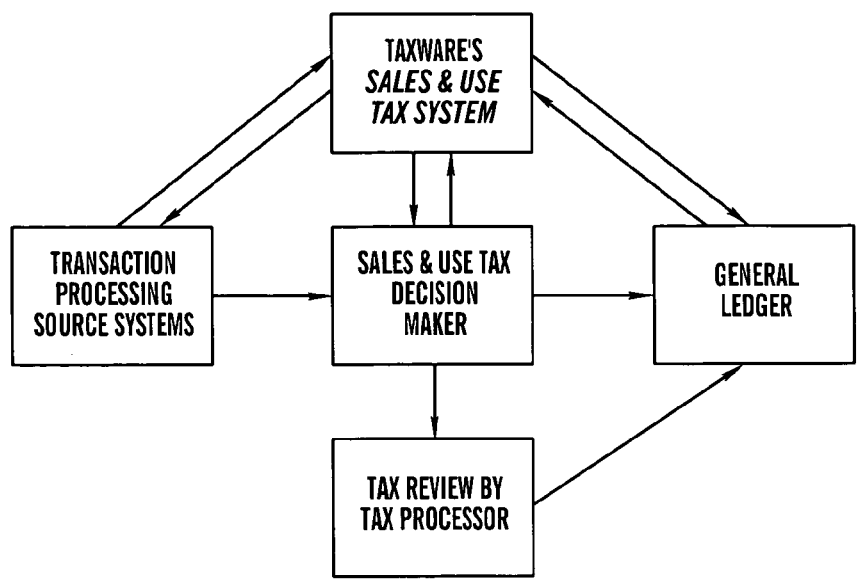
FIG. 2 is a flow diagram showing a sales and use tax computation system, in accordance with another aspect of the present invention.
Figure 3:
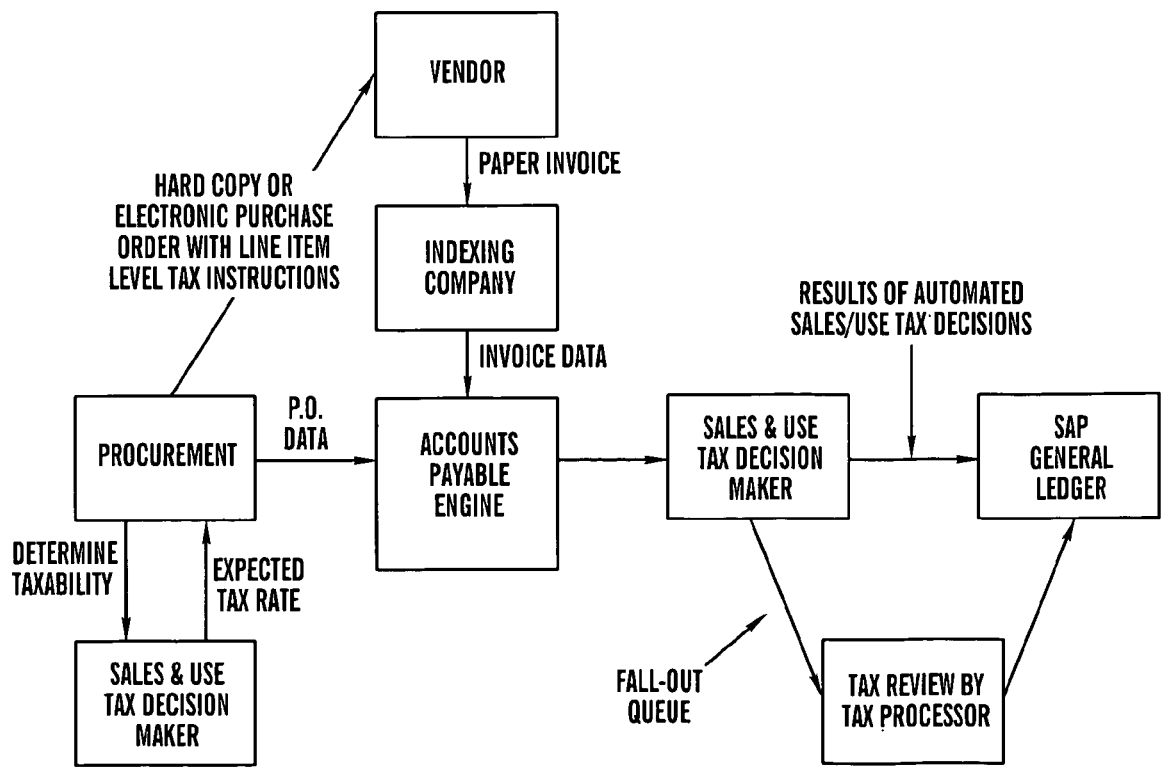
FIG. 3 is a flow diagram showing a process flow for purchase order based accounts payable source system input to the system of FIG. 2.
Figure 4:
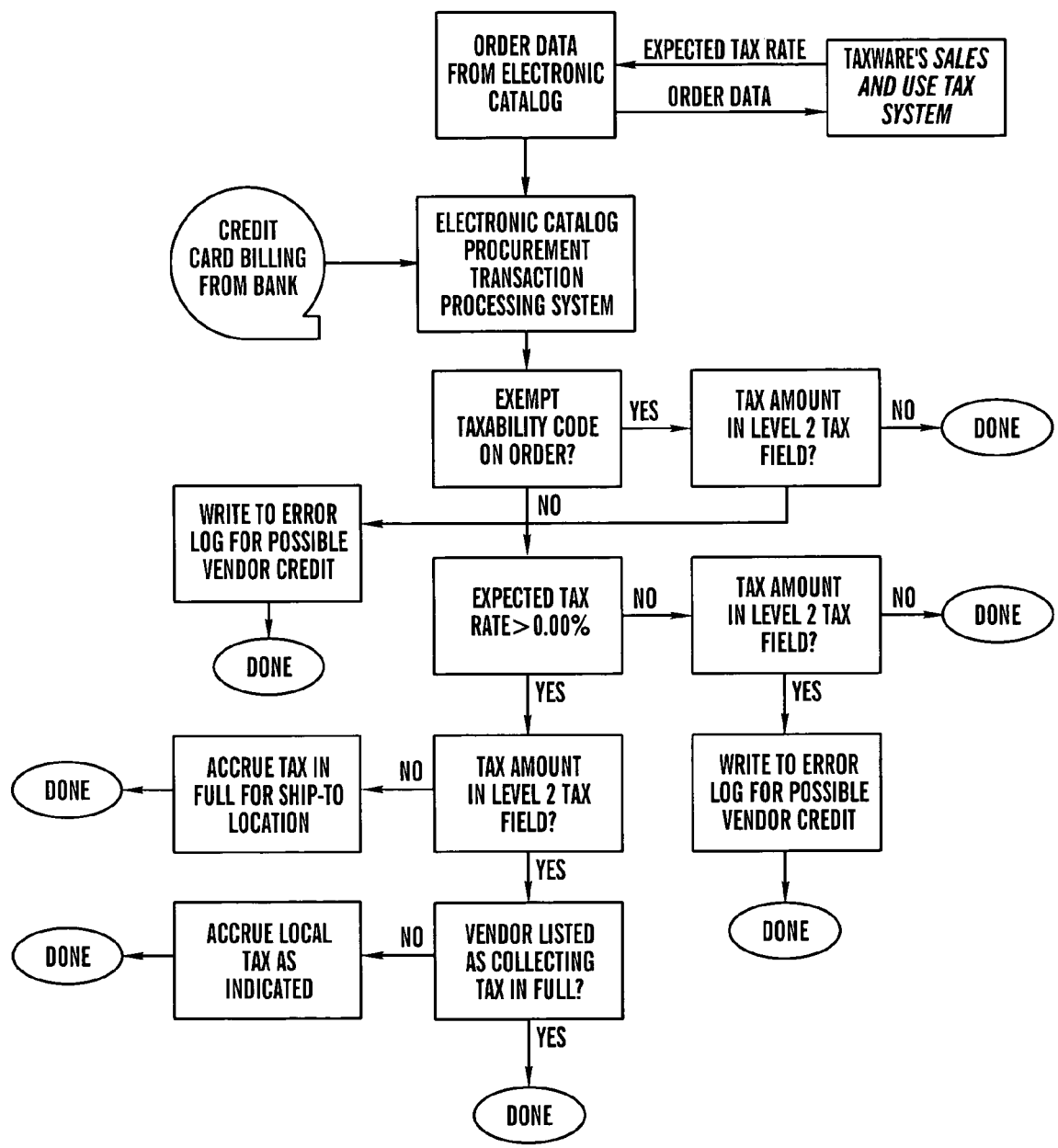
FIG. 4 is a flow diagram illustrating a process flow for catalog purchase source system input to the system of FIG. 2.
Figure 5A:
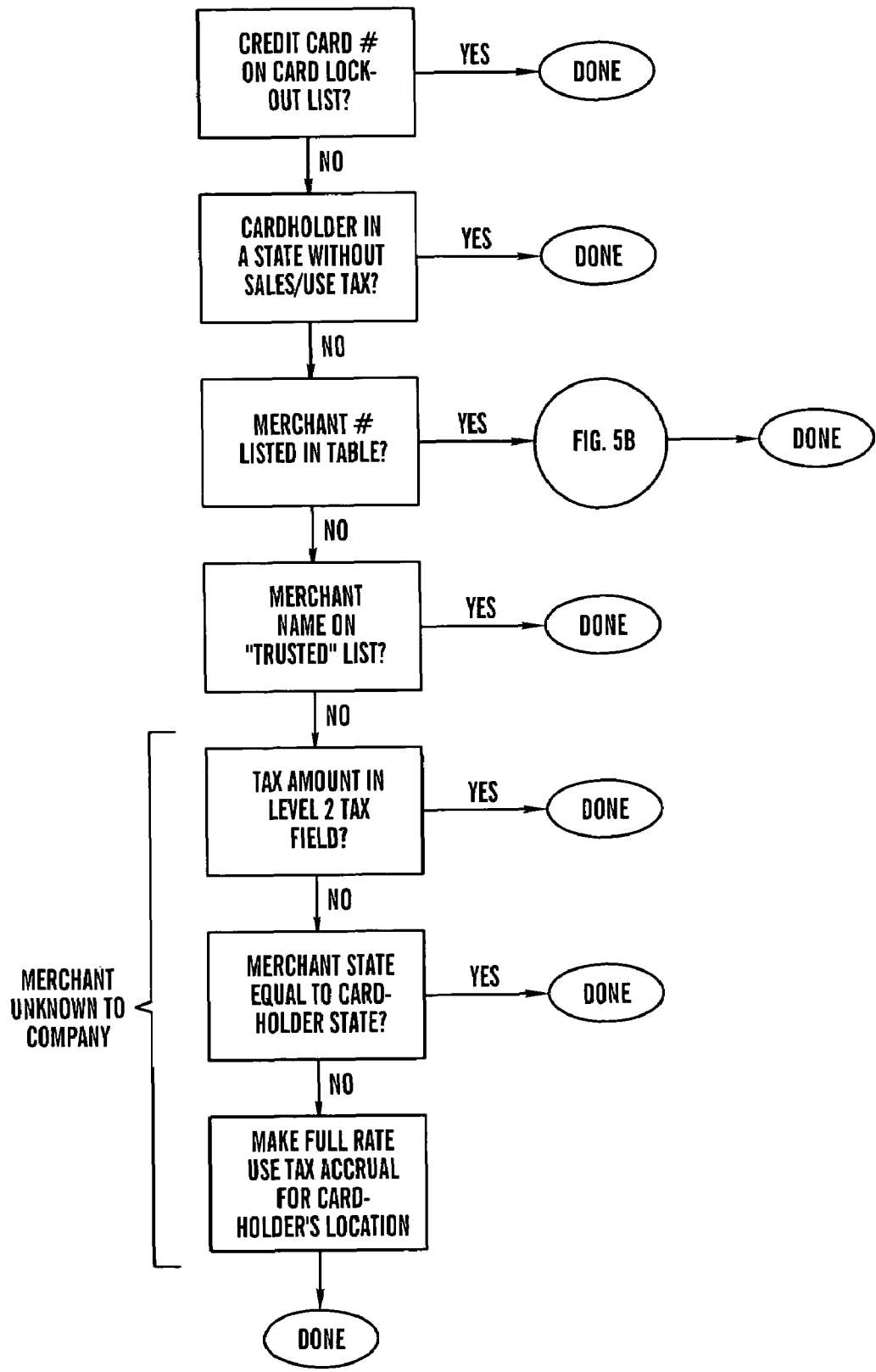
FIG. 5A is a flow diagram illustrating a first component of a process flow for procurement credit card purchase source system input to the system of FIG. 2.
Figure 5B:
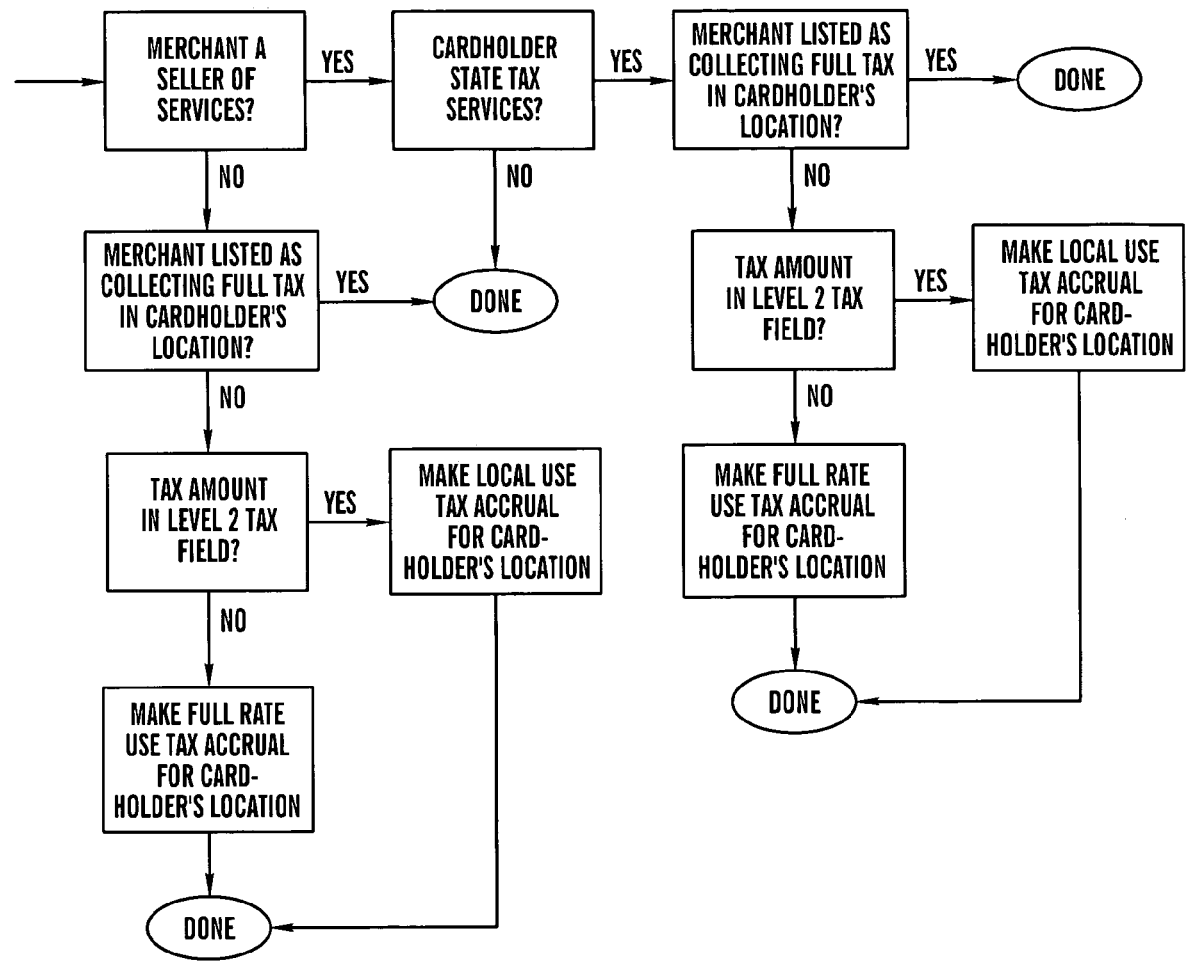
FIG. 5B is a flow diagram illustrating a second component of the process flow shown in FIG. 5A.
Figure 6:
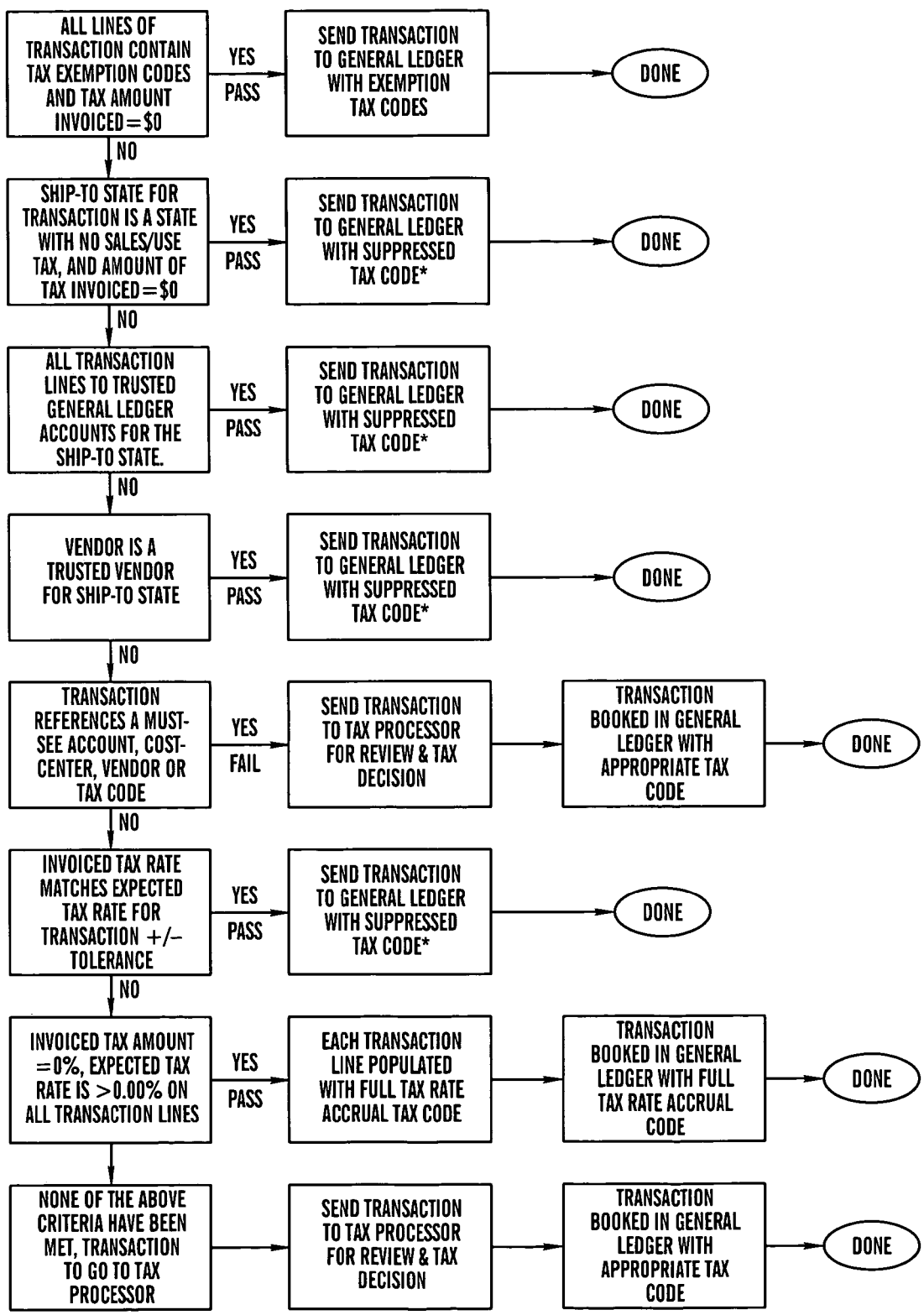
FIG. 6 is a flow diagram illustrating a process flow selected source system input to the system of FIG. 2.
Figure 7:
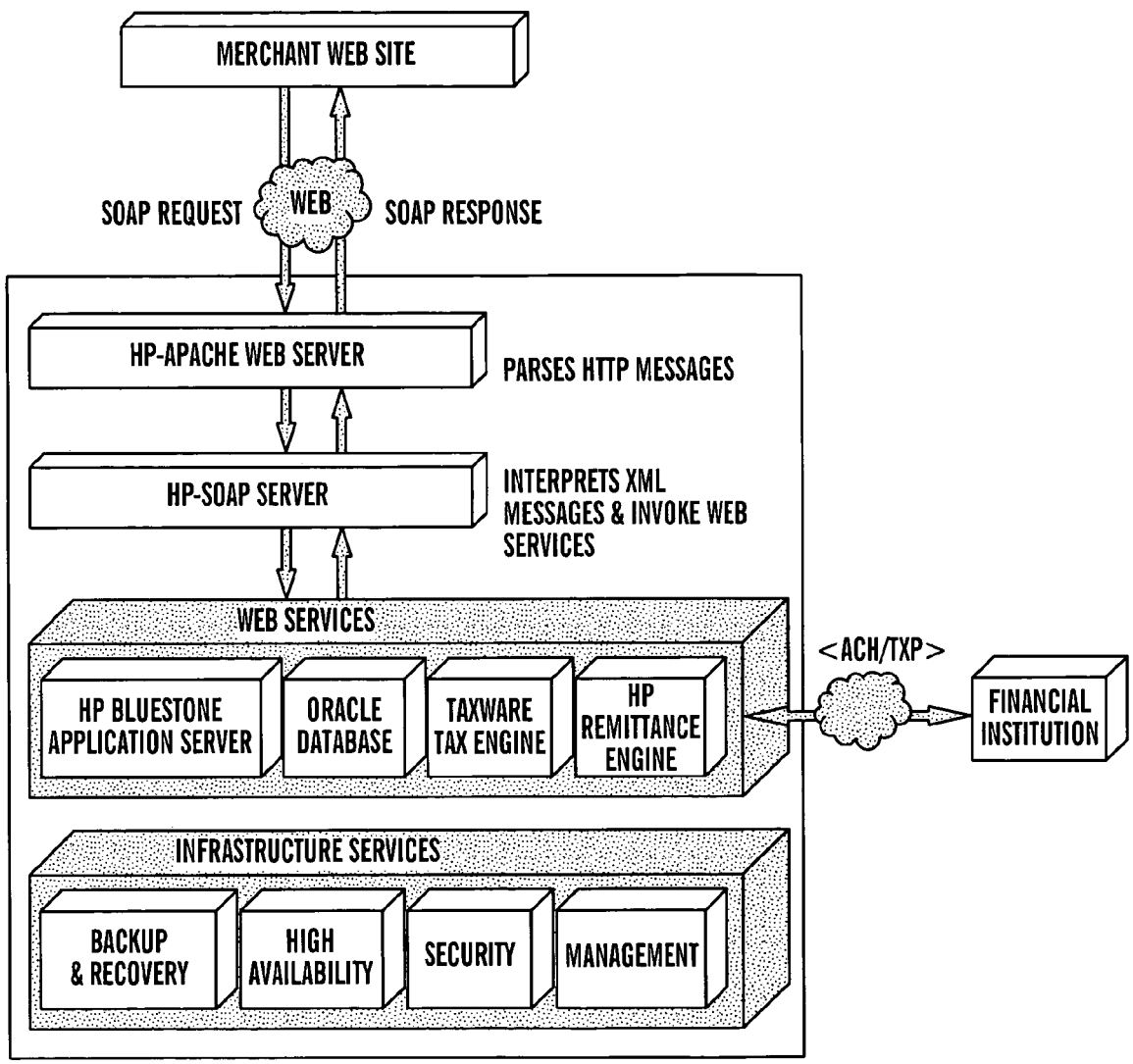
FIG. 7 is a flow diagram showing a system and a method for calculating taxes due on financial transactions, reporting the same to a selected government authority, and periodically remitting the taxes owed over an interactive communications, according to one aspect of the present invention.
Figure 8:
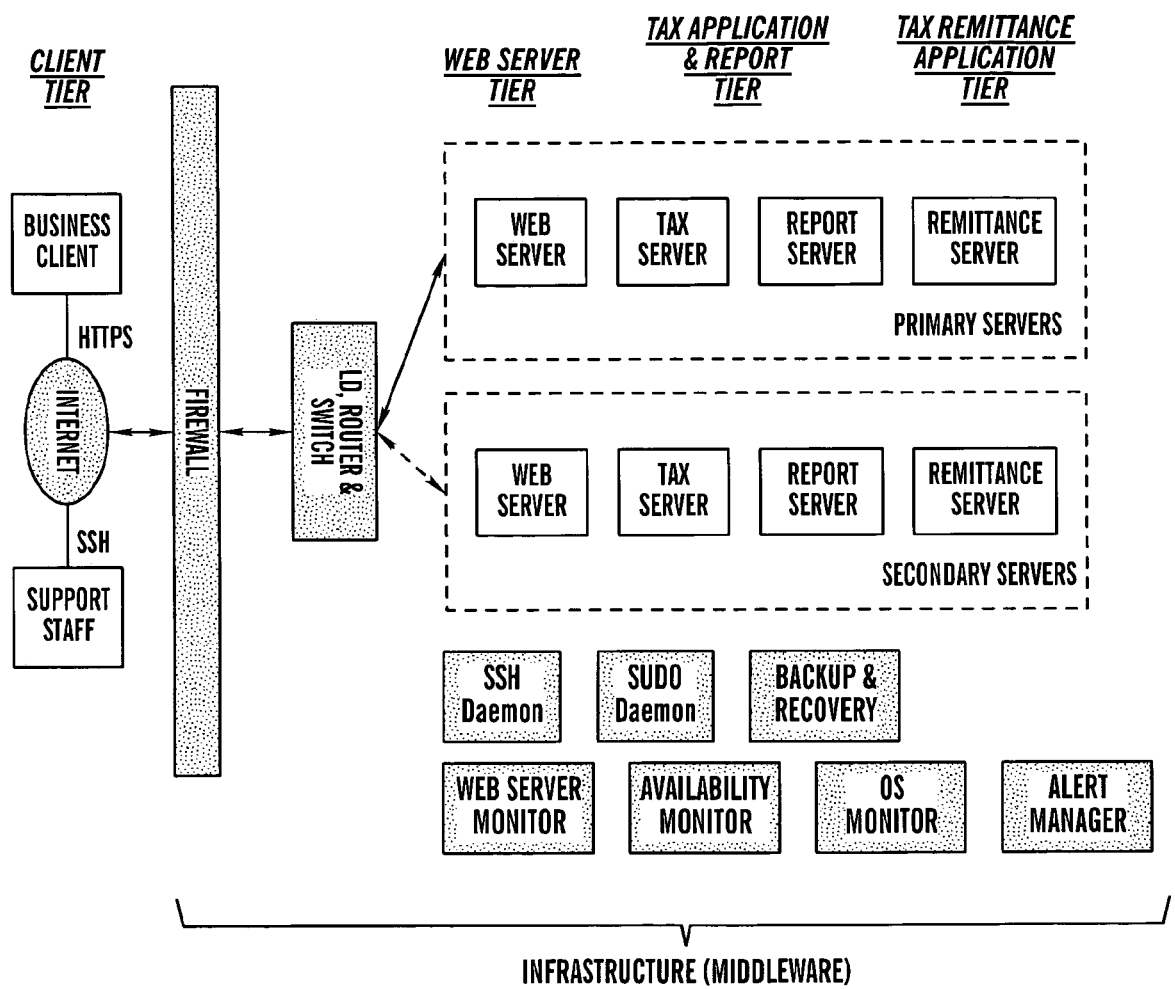
FIG. 8 is a flow diagram showing an infrastructure services module of the system and method of FIG. 7.

Referring now to the drawings and, more particularly, to FIGS. 1–11, there is shown a specific, illustrative program controlled apparatus, system and method for identifying taxable financial transactions, collecting data based on the transactions, and calculating any tax due on the transactions, in accordance with the present invention. In particular, a program controlled apparatus, e.g., a Unix based server such as an HP 9000, is provided for making tax related decisions. The apparatus includes a first database having a directory of parameters identifying all domestic taxing jurisdictions, e.g., government authorities, by zip code requiring payment of taxes. Also provided is a second database with a directory of parameters identifying the taxability of goods and/or services by each jurisdiction identified by zip code in the first database. A third database of the apparatus includes a directory of parameters identifying all domestic sales, use and rental tax rates for each zip code. Preferably, the server has programming for determining all taxes due on each transaction request input to the apparatus, according to the directory parameters maintained by the first, second and third databases. Alternatively to, or concurrently with, the zip code identification arrangement, the directory parameters maintained by the databases are organized by geocode, by jurisdiction name or the like.

According to another aspect of the present invention, a method is provided for identifying taxable financial transactions relating to purchase order based accounts payable system or the like, collecting data based on the transactions and calculating any taxes due on the transactions. Initially, an XML-based transaction request is input from a selected transaction processing source system to a program controlled apparatus for performing tax related transactions. Lines of the transaction request are then searched to determine whether lines of the transaction request, preferably all lines, contain tax exemption codes and a zero tax amount invoiced by the taxpayer. If located, the transaction request is transmitted to a general ledger system and the transaction request is recorded, with the same tax exemption codes found in the transaction request of the general ledger system.

If the above criteria is not met, then lines of the transaction request are searched, again desirably all lines, to locate a ship-to jurisdiction for the transaction request that has no sales or use tax as well as no tax amount invoiced by the taxpayer. If this information is found, then the transaction request is transmitted to a general ledger system and recorded with a selected tax code in the general ledger system. Thereafter, if the above criteria has not caused the transaction to be transmitted to the general ledger system, then a selected database directory of trusted general ledger accounts for each jurisdiction is parsed to determine whether each line of the transaction request contains trusted general ledger accounts, and if located, then the transaction request is transmitted to the general ledger system and the request is recorded with a selected tax code in the general ledger system.

In one embodiment, a trusted general ledger account is an account with a relatively low, preferably extraordinarily low, sales/use tax compliance risk because all purchases booked to such account either qualify for a sales/use tax exemption, or are not subject to sales/use taxes. For example, inventory accounts are "trusted" because inventory may be purchased "for resale" and free of sales/use tax. Purchases booked to a trusted general ledger account, when the vendor has applied sales and/or use tax to the transaction, should be reviewed by a person if unpaid or written to an error log for follow-up investigation if already paid.

Thereafter, if the above criteria has not caused the transaction to be transmitted to the general ledger system, then a list in a first selected database directory of the apparatus of trusted vendors for the ship-to-jurisdiction is parsed to determine whether the taxpayer of the transaction request is a trusted vendor. According to one aspect of the present invention, a trusted taxpayer is, for instance, a vendor that has been identified as either: (1) always selling a product or service that is not subject to tax, or (2) always selling a product or service that is taxable, and reliably applies the correct amount of tax (full rate) to the transaction. An optimal application of this concept is to "trust" vendors for specific taxing jurisidictions.

If found on the list, then the transaction request may then be transmitted to a general ledger system and recorded with a selected tax code in the general ledger system. Thereafter, if the above criteria has not caused the transaction to be transmitted to the general ledger system, then a list in a second selected database directory of the apparatus for must-see general ledger accounts, cost centers, taxpayers and tax codes is parsed to determine whether the account number, cost center, taxpayer and tax code input with the transaction request corresponds to a corresponding account number, cost center, taxpayer and tax code on the list. If found, the transaction request is transmitted to a tax processor to review the request and determine the amount of sales and/or use tax to be paid to the taxpayer and/or accrued and self-reported. The tax accrued, if any, is then recorded in the general ledger system.

For example, a must-see general ledger account is an account that has a relatively high risk from a sales/use tax compliance standpoint. In one embodiment, printed marketing literature general ledger account may be designated a "must see" account because their printed marketing literature invoices tend to be high dollar amounts, and the literature tends to be drop-shipped to many taxing jurisdictions. These high dollar and/or high tax complexity transactions can be reviewed (and are preferably reviewed) by a person skilled in tax compliance who can resolve their taxability.

Thereafter, if the above criteria has not caused the transaction to be transmitted to the general ledger or a tax processor, then a list in a third selected database directory of the apparatus is parsed to determine whether a tax rate corresponding to the tax amount invoiced by the taxpayer matches an expected tax rate for the transaction request and is within a selected tolerance of error. If located, the request is transmitted to the general ledger system and recorded with a selected tax code in the ledger system.

If, in turn, the above criteria has not caused the transaction to be transmitted to the general ledger system or a tax processor, then a list in a third selected database directory of the apparatus is parsed to determine whether a tax rate corresponding to the tax amount invoiced by the taxpayer equals zero, and whether the expected rate for the transaction is the full rate of sales or use tax for lines, preferably all of the lines, of the transaction request. If located, the request is transmitted to the general ledger system and recorded with a selected tax code in the system causing a full rate sales or use tax accrual for each line of the transaction request. Thereafter, the tax accrued is also recorded in the general ledger system.

Finally, if the above criteria has not caused the transaction to be transmitted to the general ledger system or a tax processor, then the transaction request is next transmitted to a tax processor for review and for a determination of the amount of sales and/or use tax to be paid to the taxpayer and/or accrued and self-reported. Thereafter, the tax amount paid to the taxpayer and/or accrued, if any, is recorded in the general ledger system.

Turning now to another aspect of the present invention, a method is provided for identifying taxable financial transactions relating to electronic catalog purchases, for instance, then data based on the transactions is collected and any taxes due on the transactions is calculated. First, an XML-based transaction request is input from a selected transaction processing source system to a program controlled apparatus for performing tax related transactions. The class of transaction to be processed is then identified. If the transaction is an electronic catalog purchase, then it is determined what kind of tangible personal property or service is being purchased, based on the commodity code associated with each catalog item.

Next, it is determined whether the purchaser has indicated that a sales and/or use tax exemption is applicable to the item purchased. Generally speaking, there are two categories of sales and/or use tax exemption: (1) purchasers who can claim a sales/use tax exemption based on who they are (e.g., U.S. Government, state and local government agencies, non-profit and/or charitable organizations, etc.), and (2) purchasers who can claim a sales/use tax exemption based on how they use the property purchased (e.g., purchased for resale, purchased for use in manufacturing, purchased for use in research and development, etc.) It is noted that sales and use tax exemptions vary from state to state.

If the transaction is indicated as being exempt from tax, and the tax amount invoiced by the taxpayer is zero, then the transaction is complete. If the transaction is indicated as exempt from tax, and the tax amount invoiced by the taxpayer is an amount greater than zero, then the apparatus writes to a selected error log, allowing the user to apply to the taxpayer for a credit of the tax amount charged.

Thereafter, a process is encountered that relates to computation of the amount of sales/use taxes due on the transaction. For instance, if the item of goods is not tax exempt, a selected database directory of the apparatus is parsed to locate a tax rate that is applicable to the item of goods being sold. The applicable taxing jurisdiction is associated with the ship-to location input by the purchaser for the electronic catalog purchase.

The transaction request is parsed to determine whether a tax amount has been charged by the taxpayer. If no tax has been charged by the taxpayer, and the goods or services purchased are taxable for the ship-to jurisdiction, then the apparatus will transmit the transaction request to the general ledger system with a selected tax code in the general ledger system causing a full-rate sales/use tax accrual on all lines of the transaction indicated as taxable per the commodity code. Thereafter, the tax amount accrued, if any, is recorded in the general ledger.

Should the tax have been charged by the taxpayer, a database directory of taxpayers is searched to determine whether a record exists for the taxpayer in the ship-to jurisdiction. If a match is found, then the record in the database indicates whether the taxpayer collects tax in full for the ship-to taxing jurisdiction or merely collects the jurisdiction level sales/use tax for the ship-to jurisdiction.

If a tax amount was charged by the taxpayer, and the database indicates that the taxpayer collects the full rate of sales/use tax for the ship-to jurisdiction, or if a tax amount was charged by the vendor and no record is found for the vendor in the database, then the transaction request is transmitted to the general ledger system with a selected tax code in the general ledger system causing no accrual of tax. Thereafter, the amount of tax paid to the taxpayer is recorded in the general ledger.

If a tax amount was charged by the taxpayer, and the database reflects that the taxpayer collects only the jurisdiction sales/use tax rate for the ship-to jurisdiction, or if a tax amount was charged by the taxpayer and no record is found for the taxpayer in the database, then the transaction request is transmitted to the general ledger system with a tax code in the general ledger system causing a local sales/use tax accrual on lines of the transaction request, preferably all lines, indicated as taxable per the commodity code, for the ship-to jurisdiction, if such local tax accrual is required for the ship-to jurisdiction. The amount of tax paid to the taxpayer, and local tax accrued, if any, is then recorded in the general ledger.

Where no tax rate is deemed applicable, a list is parsed in a selected database directory of those items of goods that are tangible personal property. As before, should the item of goods matches an item of goods in the list, then the apparatus writes to a selected file that accrual of tax on the item is due in full. Processing of the transaction is then completed. Finally, where the item of goods does not match an item of the list, then the apparatus writes to a selected file that no accrual of tax is due on the item and completes processing of the transaction.

An analogous method is applied to procurement credit card transactions. In one embodiment, a method for identifying taxable financial transactions relating to procurement credit cards, collecting data based on the transactions and calculating any taxes due on the transactions. Initially, an XML-based customer transaction request is input from a selected transaction processing source system to a program controlled apparatus for performing tax related transactions. Preferably, the source system is a procurement credit card system. Next, the class of transaction to be processed is identified and it is determined whether the transaction is for a selected number of items of goods or services. A list is then searched in a first selected database directory of those credit card numbers to be denied access to the apparatus, and for a credit card number input by the customer with the transaction request.

Thereafter, a list in a second selected database directory is searched of those jurisdictions having a service override status. The list is also searched for a jurisdiction input by the customer with the transaction request. If the jurisdiction input is not on the list, then processing of the transaction is completed. If the jurisdiction input is on the list, then a list is parsed in a third selected database directory of those jurisdictions charging the full tax applicable to the sale of services. Next, the list for the jurisdiction input by the customer is searched and if the jurisdiction input is on the list, then a selected file is written to indicating that no accrual of tax is due on the services. If, on the other hand, the jurisdiction input is not on the list and the applicable tax is zero, then a selected file is written to designating that accrual of taxes on the services is due in full.

Should the jurisdiction input not be on the list and if the applicable tax is not zero, then further, a selected file is written to indicating that no accrual of taxes is due on the services. A list in a selected fourth database directory is parsed of those taxpayers subject to local tax accrual, and the list is searched specifically to identify the taxpayer input with the transaction request. Should the taxpayer be found, a selected file is written to stating that accrual of local taxes is due on the services. If not found on the list, then a selected file is written to indicating that no accrual of local taxes is due on the services. Processing of the transaction may then be completed.

Although the present invention has been shown and described for receiving input from specific accounts payable source systems, it will be appreciated that other source system input may be utilized, within the spirit and scope of the present invention. More particularly, in addition to source systems relating to purchase order based accounts payable systems, procurement credit card systems and electronic catalog procurement systems, source systems applicable to the present invention include, but are not limited to, purchase order based accounts payable systems utilizing workflow technology, non-purchase order based accounts payable systems (e.g., an electronic disbursement voucher system), electronic employee reimbursement systems, intracorporate billing systems, electronic data interchange systems (EDI), or the like.

Moreover, the present invention is suitable for handling numerous types of data elements commonly used for making sales and/or use tax payment/accrual decisions. Included are invoice/transaction date, invoice/transaction amount ($) per line item, total tax amount charged by taxpayer, commodity code per line item, taxability indicator per line item, ship-to location per line item, taxpayer's name and/or taxpayer code, taxpayer's ship-from location (city, state and zip code), charge-to general ledger account per line item, charge-to department/cost-center per line item, freight charge for transaction/invoice, employee's name/number (Employee=transaction initiator), employee's home department/cost-center, procurement credit card number, taxpayer's taxing location(s), taxpayer's sales type (seller of services vs. seller of tangible personal property) and discounts taken for early payment.

Referring now to system wide aspects relating to the present invention, it is preferred that a series of discrete functional modules be provided for facilitating network-based services. Each module is desirably implemented according to industry standards, i.e., Web-based Industry Standards such as XML, Java, SOAP and the like, such that the modules may operate collaboratively. These modules are optimally organized into a central, network service module for processing data, e.g., XML-based transaction requests. According to one embodiment, this module includes an applications server, a database server, a sales tax computation module and a sales tax remittance module. Specifically, the applications server receives an XML-based transaction request from the third server. The transactional data for the request is then stored in a first selected file of the database server. The sales tax computation module then computes the sales tax due on the corresponding transaction and effects storage of the tax due in a second selected file, also housed by the database server.

Thereafter, the second file is converted by the sales tax remittance module from an XML-based format to a TXP-based format for use in an automated clearing house network. The second file is periodically transmitted by the tax remittance module, through the network, to a selected financial institution for electronic funds transfer to a selected government agency.

This arrangement, in supporting both conventional, Web-based software and batch mode software, offers numerous competitive advantages. The tax calculation system sends an XML message request to the system of the present invention, which, in turn, replies with an XML message response. This on-line capability facilitates an immediate system response to any request, whether an error message, a rejection, or accepted transaction identifier. Although the above-described automated clearing house network was developed in the 1970's for batch processing only and, more particularly, to reliably process very large volume payments at a relatively low cost, the present invention transforms any on-line XML transaction request into an automated clearing house network TXP batch file. In this manner, it essentially transforms that system from a batch only operation into one that can repeatedly handle individual on-line transactions.

Figure 9:
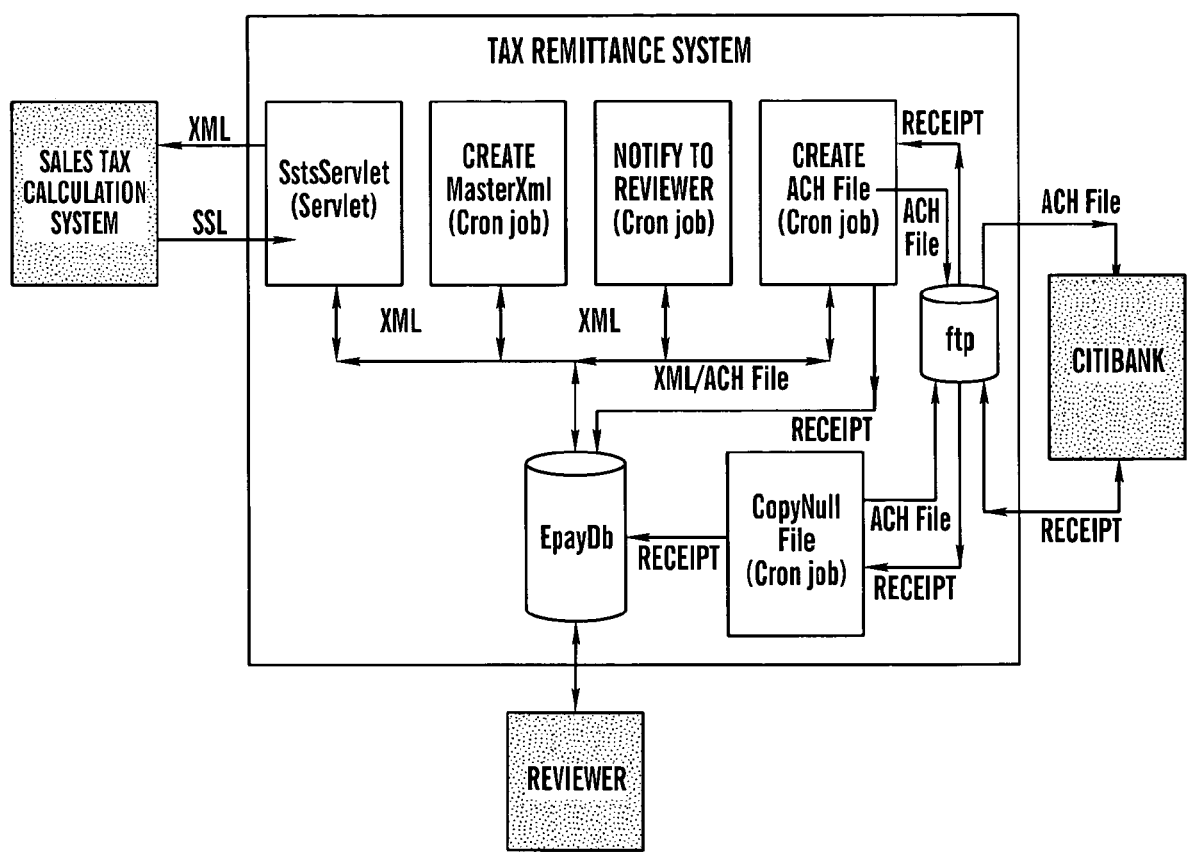
FIG. 9 is a schematic diagram showing a module for remitting tax related information to a selected financial institution, according to one aspect of the present invention.
Figure 10:
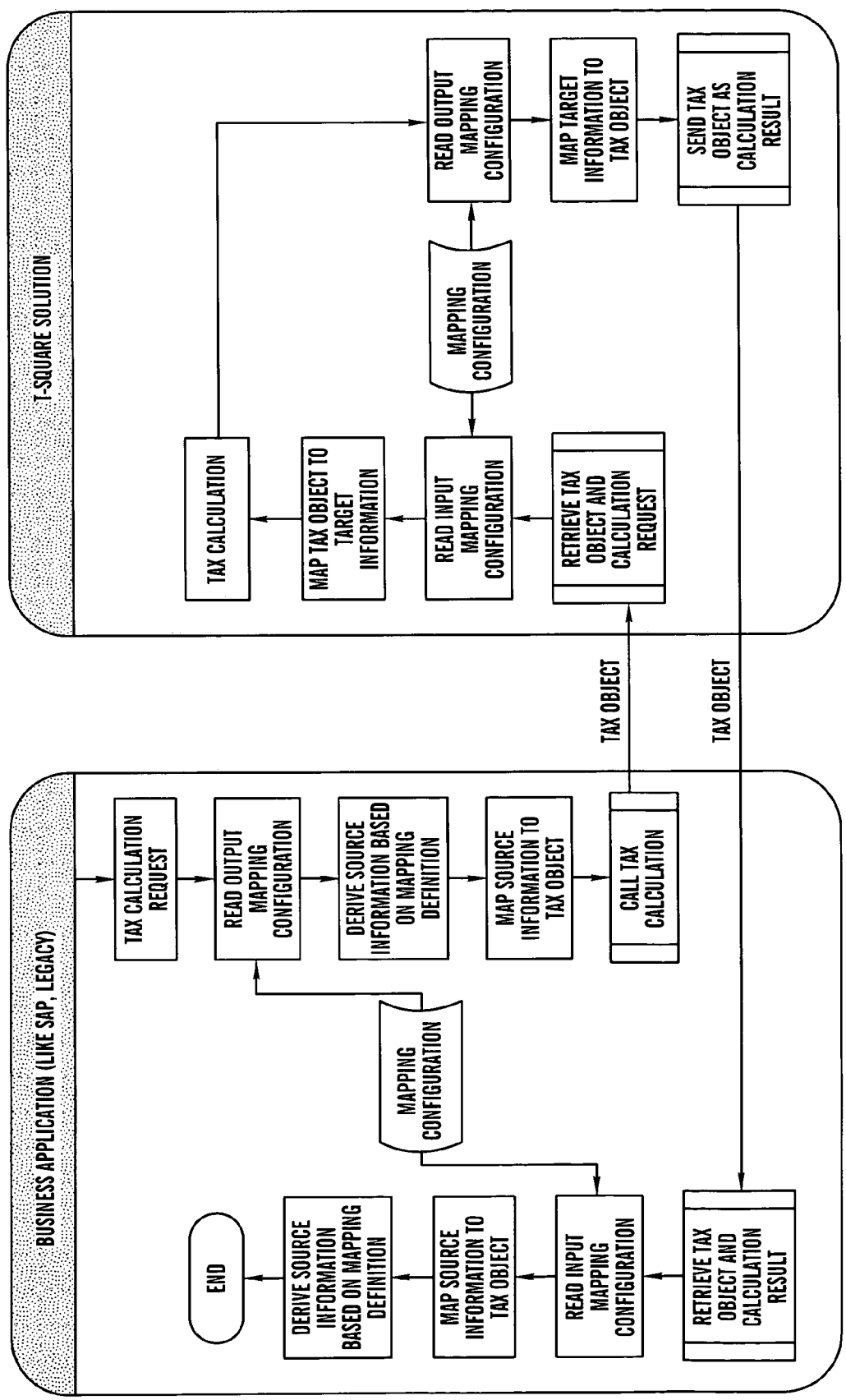
FIG. 10 is a flow diagram showing a module for sales tax computation for taxpayers, according to one aspect of the present invention.
Figure 11:
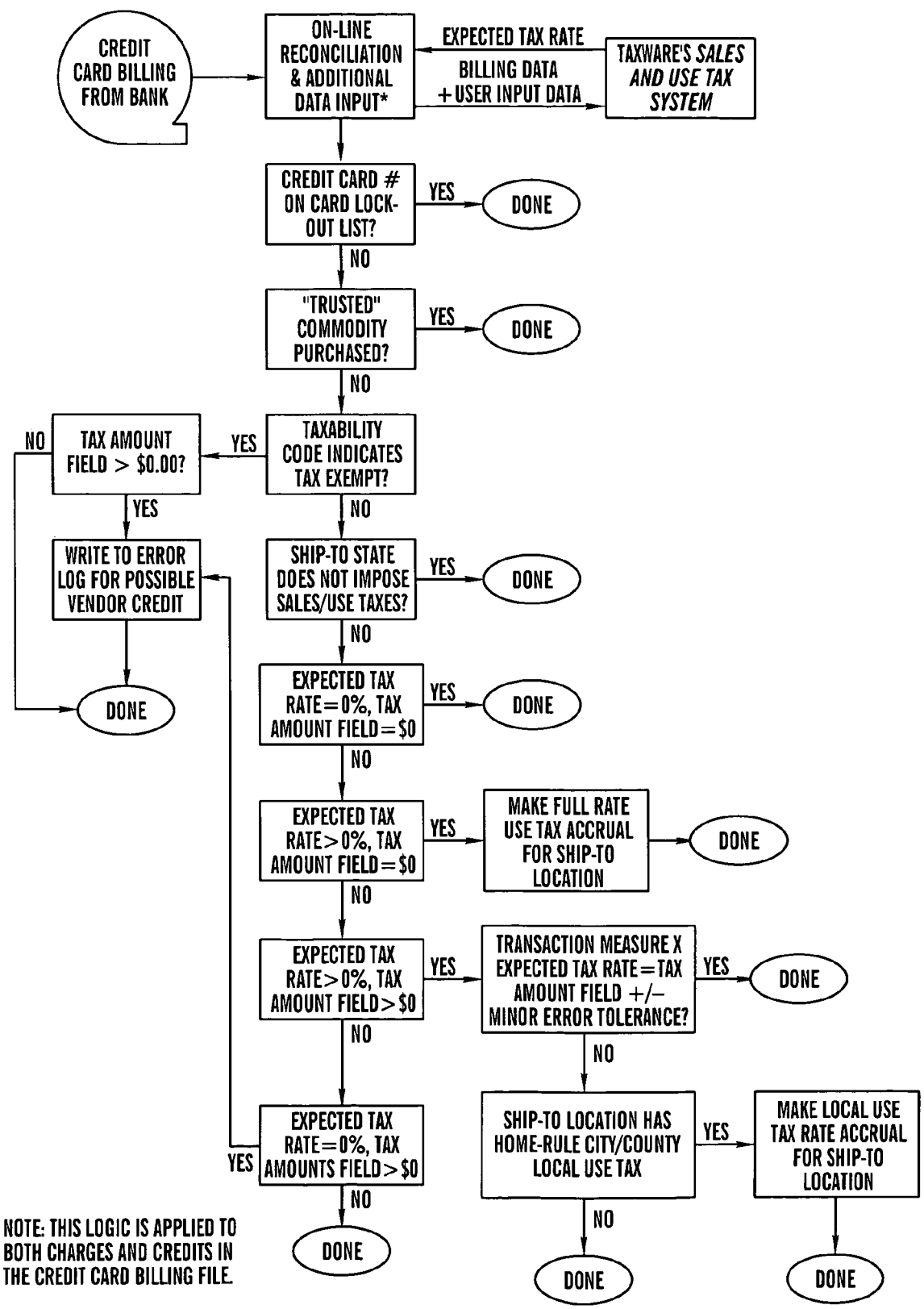
FIG. 11 is a flow diagram illustrating a process flow for a credit card purchase or credit source system input to the system of FIG. 2.

Referring now with greater specificity to operative components of network services module 170, as best seen in FIG. 9, they include first module 171 or interface for subscriber system 101 that electronically contacts service provider system 102, preferably located remotely thereto, each time a taxable transaction is initiated. This interface takes the form of an industry standard interface, e.g., simple object access protocol (or SOAP). Alternatively or concurrently, a novel industry standard interface is utilized, as shown in FIG. 14. An interface of this general description is set forth, for instance, in a co-pending U.S. patent application Ser. No. 60/333,110, entitled METHODS, DATA RECORD, SOFTWARE INTERFACE, DATA WAREHOUSE MODULE AND SOFTWARE APPLICATION FOR EXCHANGING TRANSACTION-TAX-RELATED DATA, HP Docket No. 100111406, filed on the same date herewith by Wolfgang Bross, Norbert Heumueller, Fritz Oesterle, Gulati, Robert J. Gallagher, Theresa O. Watson, Natalie D. Milner-Upshaw, Penny L. Arviso, Paul J. Kunzler and Barry Schneiderman, the disclosure of which is hereby incorporated by reference herein in its entirety.

It is preferred that second module 175 operate as a tax computation engine, desirably also operating on a server of the remotely located service provider. For instance, this engine identifies the jurisdiction from which the merchandise purchased has been shipped, the jurisdiction to which the merchandise is shipped, the effective sales and/or use tax rates applicable from each jurisdiction, and related information. In one embodiment, sales and/or use tax computation is performed by conventional software, e.g., Taxware, a product of Taxware International, Inc.

Alternatively or concurrently, the solution is provided by an enhanced software system for computation of sales and/or use tax for payments and accruals, e.g., T-Square. A system of this general description is described, for example, in a co-pending U.S. patent application Ser. No. 60/333,003, entitled INTELLIGENT APPARATUS, SYSTEM AND METHOD FOR FINANCIAL DATA COMPUTATION AND ANALYSIS, HP Docket No. 100110474, filed on the same date herewith Robert J. Gallagher, Theresa O. Watson, Natalie D. Milner-Upshaw, Penny L. Arviso, Paul J. Kunzler and Barry Schneiderman, the disclosure of which is hereby incorporated by reference herein in its entirety.

While the present invention is shown and described as using a tax processor for "human intervention", it is understood that an advanced automated system or like robotic system may be utilized, within the spirit and scope of the present invention. In this manner, whether the tax processor is a human or a machine, substantially complete system automation is realized, according to the objectives of the present invention.

A third network services module is provided relating to a transaction processing system. This system essentially consummates each transaction corresponding to the transaction request received. The system may take the form, for instance, of an e-commerce system, a procurement system, an accounts payable system, or the like.

To utilize the network service, a taxpayer, for instance, subscribes to a computer system of a selected service provider and obtains software (and alternatively or concurrently, hardware) necessary for interfacing with operations of the service provider. More particularly, the software enables communication between a taxpayer subscriber computer system and a service provider computer system over an interactive communications network. The taxpayer then installs the software on the subscriber system. Preferably, the taxpayer's computer system is Web-compatible, i.e., suitable for establishing conventional Web-based communications with the service provider.

In addition, the service provider system is equipped with modular software, namely, a plurality of functional modules for operating in a network, e.g., a Web-based environment. Each time the taxpayer undertakes a transaction, the taxpayer system sends a transaction request, in message or document form, to the service provider system using conventional Web protocols (e.g., HTTP Post). For example, a transaction request is an XML-based message file containing or identifying a selected class of goods (e.g., clothes), the value of a selected item of the goods, the taxpayer location, the taxpayer's taxpayer identification number (and/or taxpayer's account number with the service), the time of the message, the date and the shipping location. The service provider system, in turn, transmits this information to the tax computation module. This module calculates the amount of sales tax due (for each applicable city, state and/or territory) and transmits an appropriate XML-based reply to the taxpayer which includes the sales tax due and total amount of the transaction.

Thereafter, the taxpayer system displays to the taxpayer via the network browser the total amount due and accepts the message for consummation of the transaction. If consummation has occurred, another XML-based message is formulated by the taxpayer system and sent back to the service provider system for activation of the tax reporting module and the tax payment module.

Although the present invention has been shown and described in connection with various functional modules operating on a server of a service provider, it is understood that one or more such modules may be provided, alternatively or concurrently therewith, on a server of the taxpayer system, within the spirit and scope of the present invention.

Turning now to another aspect of the present invention, there is provided a method for identifying taxable financial transactions, collecting data based on the transactions, calculating any taxes due on the transactions, reporting the same to a selected government authority, and periodically remitting the taxes owed over an interactive communications network. Initially, a taxpayer subscribes to a service provider computer system. Software is preferably provided by the service provider and loaded onto the taxpayer computer system so as to enable communications between the subscriber system and the service provider system over the interactive communications network. To initiate operation, the taxpayer system sends an XML-based transaction request from the taxpayer system to the service provider system. In one embodiment, the message identifies, for example, the class of goods being transacted, the value of a selected item of the goods, the taxpayer location, the taxpayer's identification number, the time of the message, the date and the shipping location. The next step is to send the XML-based transaction request from the service provider system to a tax computation module, and then calculates the sales tax due on each taxable transaction in each applicable jurisdiction. A responsive XML-based reply is sent to the subscriber system, the reply including the sales tax due and total amount due for the transaction. The subscriber system, in turn, displays the sales tax and total amount due for the transaction and executes the step of accepting the reply message so as to consummate the transaction.

The foregoing description is provided for purposes of illustration and not to limit the intended environment or application of the present invention. The remaining structural and functional aspects of the operative network components are set forth in the related applications, which are incorporated by reference herein, and further description is considered unnecessary for illustration of the present invention.

At the kernel of the present invention is an automatic (real-time or periodic) tax calculation scheme for making tax decisions. When coupled with an interactive tax reporting and remittance system, tax related information and funds may be transmitted to state and local government's treasuries on each taxable transaction of the taxpayer. This virtually eliminates the need for the taxpayer to manually file a tax return, e.g., sales and/or use tax.

In another embodiment, the above-described method is performed by machine code, in modular form, that is resident on a server of the service provider system, hence, a service provider module version. Similarly, one or more such modules may be resident on the subscriber or taxpayer system, i.e., a taxpayer module version. Preferably, the taxpayer, in addition to the taxpayer module, has a computer system, and/or a computerized cash register system, for effective transmission of each transaction to the service provider module.

In another embodiment, the above-described method is performed by machine code, in modular form, resident on a server of the service provider system, hence, a service provider module version. Similarly, one or more such modules may be resident on a server of the subscriber system, i.e., a subscriber module version. It is preferred that the subscriber module reside on a computer system, e.g., an HP 9000 Server or HP Netserver such as the O. C. Tanner Virtual Store at www.octanner.com, and/or a computerized cash register bank or network, e.g., an in-store processor including an HP 9000 Server linked via intranet with a plurality of conventional NCR computer cash registers, for effective transmission of each transaction to the provider module. The service provider module desirably also resides on a computer system, e.g., HP 9000 Server or the like.

Although the present invention has been shown and described in connection with a landline, Web-based network, it will be understood by those skilled in the art that other methods could be utilized, giving consideration to the purpose for which the present invention is intended. For instance, a wireless communications network or a combination land-based and wireless network could be used, within the spirit and scope of the present invention.

A communications infrastructure, i.e., the Internet, intranet or extranet, links a server of the subscriber system to the service provider system. In one embodiment, the service provider system has programming that comprises a plurality of modules operating preferably over an interactive communications network, e.g., the Internet, intranet or extranet. Alternatively or concurrently, the system operates over telephone lines through a conventional mail order system, or as part of a network for monitoring over-the-counter transactions.

In operation, according to one embodiment, each time a transaction is undertaken by (or with) the taxpayer, the taxpayer system electronically transmits a transaction request or message file to the service provider system, e.g., by sending an e-mail message, making a dial-up connection or the like. As an example, a transaction request is an XML-based data file that contains data describing the type of goods (e.g., food), the value of a selected item of the goods, the taxpayer location, the taxpayer taxpayer number (or account number with the service provider), the time and date information as well as the shipping location. In response, the service provider's system delivers this information to a sales tax computation module.

Next, a module, in accordance with the present invention, determines the sales tax for the transaction performed in each applicable jurisdiction (where the transaction occurred in multiple tax districts), the tax rate and formats. It then sends an XML-based reply to the taxpayer. The taxpayer system displays to its customer, through the Web browser, the total amount due and other tax related details, typically through a web browser. The customer then decides whether or not to consummate the transaction. If the consumer accepts the transaction, then a new XML-based message is sent from the customer to the service provider which stores the record of the transaction in a database.

At regular intervals (e.g., daily, weekly, monthly or quarterly), according to one aspect of the present invention, the sales tax computation module sends XML-based transaction requests or like instructions to the system of the present invention to transfer appropriate funds to a service provider account. Instructions are also provided to electronically pay the appropriate local, state and/or federal government authorities, e.g., government treasuries. Each authority preferably has audit and report generation capability through direct tax authority access to the client-reporting module. Also, the client may request that the transaction be reported to selected government authorities so as to determine the amount of the taxes paid for the current fiscal period. Optionally, the return-generating module may periodically (e.g., quarterly, semi-annually or annually) automatically generate and electronically file appropriate tax return information with the appropriate authorities.

Although the present invention is shown and described as part of an interactive communications network, it will be understood by those skilled in the art that, in view of its modular form, it may not only operate within an intranet, extranet, but also may be customized for independent operation, giving consideration to the purpose for which the present invention is intended.

The foregoing description is provided for purposes of illustration and not to limit the intended environment or application of the present invention. The remaining structural and functional aspects of the automated clearing house network are known by those skilled in the art and further description is considered unnecessary for illustration of the present invention.

Turning now to a further aspect of the present invention, system hardware preferably operates within a discrete operating environment, namely, a Unix-based system which is dedicated to sales and/or use tax computation operations, uses a conventional, high-performance operating system such as HP-UX 11.0 or the like. Desirably, in one embodiment, system applications software includes an Oracle 8i Client database with Java 1.2.2.8. Preferred application software for the server is Crystal Reports 8.0, PL/SQL, Genie, TaXML, Financial Link and XMLPost. Alternatively or concurrently, a Web server, for instance, IPlanet Web Server 4.1 SP5 is used as well as an Oracle 8i database or the like equipped with Java 1.2.2.8.

Also alternatively or concurrently, a second Unix-based system is provided that similarly utilizes a conventional Unix operating system such as HP-UX 11.0 and is dedicated to sales and/or use tax remittance functions. It is also desirable that the system utilize an Application Server, e.g., an HP BlueStone TeS 7.3 or a WebLogic Web Server 5.1.0, an A-Class HP9000 Server or the like, an Oracle V 8.1.6 database, and Java 1.2.2.8. In addition, it is preferred that the system applications software comprises various off-the-shelf routines such as Saxon 5.5.1, XML Convert 2., JDOM XML Parser b6, and Commpress 2000.

Optionally, a Windows NT server, e.g., an IIS 4.0 or the like, is used for sales and/or use tax reporting. This server has a conventional operating system such as an NT 4.x w/SP 6 & option pack. As with the Unix-based systems above, an Oracle 8i Client database with Java 1.2.2.8 is desired. Preferred application software for the server is Crystal Reports 8.0.

The present invention offers numerous benefits over conventional tax preparation systems and methods. First, it enables taxpayers to electronically outsource the burden of the vast majority of sales tax calculations. Second, taxpayers may now significantly reduce their internal information technology expenses since they no longer need to maintain an extensive, in-house tax department nor an internally-developed sales tax calculation system. Hence, except for cases where transactions are too complex or the dollar amount is so great as to require human intervention, taxpayers need not determine the tax rates applicable to each sales transaction, be concerned about the accuracy of the information they provide to government authorities, nor otherwise preoccupy themselves with the tax laws of multiple jurisdictions.

Finally, at the kernel of the present invention is the use of free public domain, commonly off-the-shelf (COTS) technologies, open source and other industry standard software, rather than proprietary, subscriber-specific software, such that long term supportability is assured. Examples include, but are not limited to, XML, XML/DTD, ACH/TXP, Java, JSP and J2EE, e.g., Java 1.2, HTTP Post, SOAP, Secure Shell (SSH), SSLv3, Sudo and Apache web server software, e.g., HPUX 11.0, and oracle database software, e.g., Oracle V 8.1.6. This reduces considerably their system development and deployment costs.

In addition, taxpayers no longer must purchase tax software for each business application in their portfolio, no longer require dedicated information technology resources to administer tax systems, and no longer must build custom components to integrate tax software with their specialized business applications.

Instead, an intelligent, readily customizable tax computation system is provided for automatically, securely and efficiently determining whether tax is due on a selected transaction request and, if so, calculating the taxes for the taxpayer. In one embodiment, the present invention is part of a Web service (or e-service) that is readily accessible, i.e., publically over the Internet, requires only a conventional Internet browser, e.g., Microsoft Internet Explorer, yet maximum system and data security is provided. Unlike prior systems, no specialized communications equipment, dedicated phone line, or other independent setup is required. This virtually eliminates startup costs and other large expenses usually associated with new communications systems.

The present invention's use of industry standard tools for implementing security is another helpful aspect. In particular, it is preferred that data encryption be provided by SSLv3. Authentication desirably is provided by digital certificate, public/private key authentication of SSH. Additionally, non-repudiation and data integrity security are provided by digital signature. Finally, audit security is facilitated by logging, as will be understood by those skilled in the art.

Overall, the present invention advantageously insures that tax computations are done quickly, effectively, correctly and relatively paperlessly. It also provides that tax reporting is accomplished timely, without tardiness or loss in the mail, that any additional taxes due are paid, and eliminates penalties for late or incorrect tax payments. Taxpayer, i.e., company specific, information may now be considered while making sales and/use tax payment and accrual decisions. Operating rules are readily modified, added or deleted according to operator preference, tax jurisdiction and other tax considerations. In this manner, the system may not only adapt quickly to changes in the mix of transactions input, but also select an appropriate level of risk for their company. Hence, the operator may create rules based on virtually any combination of transaction data elements. Likewise, the system is readily customized to operate with a variety of transaction processing systems, i.e., to accommodate for the data gaps of individual software systems. Moreover, by providing a "fall-out queue", the operation may readily define the sorts of transactions that warrant review by human tax specialists or the equivalent.

Various modifications and alterations to the present invention may be appreciated based on a review of this disclosure. These changes and additions are intended to be within the scope and spirit of this invention as defined by the following claims.

What is claimed is:

1. A program controlled system for identifying taxable financial transactions, collecting data based on the transactions and calculating any taxes due on the transactions, the system comprising:

a first server for hosting a first virtual portal having at least one application for providing e-content to end users, the application including a network browser for accessing, displaying and transmitting data over a network;

a second server for hosting a second virtual portal having at least one application for receiving data from the first server and for parsing the data received, wherein;

a communications infrastructure linking the first and second servers to one another;

a third server for hosting a third virtual portal having at least one application for receiving data from the second server, parsing the data received for XML-based data and interpreting the XML-based data for selected data processing operations;

a network service module for processing XML-based data from the third server, the network service module including an applications server, a database, a sales and use tax computation module and a sales tax and use tax remittance module, the network service module receiving XML-based transactional data, storing the data in a first selected file of the database, computing the sales and use tax due on the corresponding transaction, storing the sales and use tax due in a second selected file of the database, converting the second file from an Extensible Markup Language (XML)-based format to a tax payment (TXP)-based format for receipt by an automated clearing house network, and periodically transmitting the second file through the network to a selected financial institution for electronic funds transfer to a selected government authority; and an infrastructure service module having a series of discrete operations including a security function for insuring system security over the network, a system recovery function, a system backup function, a real-time and continuous accessibility function, a system monitoring function, a system load balancing function and a system scalability function;

wherein the sales and use tax computation module includes, a first database having a directory of parameters identifying all domestic taxing jurisdictions by one of zip code, geocode, and jurisdiction name requiring payment of taxes;

a second database having a directory of parameters identifying the taxability of goods and/or services by each jurisdiction identified by one of zip code, geocode, and jurisdiction name in the first database, through the use of commodity codes;

a third database having a directory of parameters identifying all domestic sales, use and rental tax rates for one of zip code, geocode, and jurisdiction name; and a server having programming for determining all taxes due on each transaction request input to the apparatus according to the directory parameters maintained by the first, second, and third databases; and wherein the first server comprises an interface module for a merchant system, and the second server is included in a service provider system;

the first server is operable to electronically contact the second server in the service provider system each time an accounts payable source system transaction is initiated; and the sales and use tax computation module is operable to calculate one of an amount of sales or use tax to pay to the merchant's vendor and an amount of sales or use tax to accrue and report on behalf of the merchant for the initiated transaction.

2. The system of claim 1, wherein the sales tax and use tax remittance module is operable to automatically receive information on a consummation of the initiated transaction and effect a transfer of the amount of sales or use tax to accrue and report on behalf of the merchant to at least one account of a selected government authority.

3. The system of claim 1, wherein the sales and use tax remittance module is operable to automatically receive information on a consummation of the initiated transaction and effect a transfer of the amount of sales or use tax to pay to the merchant's vendor to an account of a selected financial institution.

4. A program controlled system for identifying taxable financial transactions, collecting data based on the transactions and calculating any taxes due on the transactions, the system comprising:

a first server for hosting a first virtual portal having at least one application for providing e-content to end users, the application including a network browser for accessing, displaying and transmitting data over a network;

a second server for hosting a second virtual portal having at least one application for receiving data from the first server and for parsing the data received;

a communications infrastructure linking the first and second servers to one another;

a third server for hosting a third virtual portal having at least one application for receiving data from the second server, parsing the data received for XML-based data and interpreting the XML-based data for selected data processing operations;

a network service module for processing XML-based data from the third server, the network service module including an applications server, a database, a sales and use tax computation module and a sales tax and use tax remittance module, the network service module receiving XML-based transactional data, storing the data in a first selected file of the database, computing the sales and use tax due on the corresponding transaction, storing the sales and use tax due in a second selected file of the database, converting the second file from an Extensible Markup Language (XML)-based format to a tax payment (TXP)-based format for receipt by an automated clearing house network, and periodically transmitting the second file through the network to a selected financial institution for electronic funds transfer to a selected government authority; and an infrastructure service module having a series of discrete operations including a security function for insuring system security over the network, a system recovery function, a system backup function, a real-time and continuous accessibility function, a system monitoring function, a system load balancing function and a system scalability function;

wherein the sales and use tax computation module includes, a first database having a directory of parameters identifying all domestic taxing jurisdictions by one of zip code, geocode, and jurisdiction name requiring payment of taxes;

a second database having a directory of parameters identifying the taxability of goods and/or services by each jurisdiction identified by one of zip code, geocode, and jurisdiction name in the first database, through the use of commodity codes;

a third database having a directory of parameters identifying all domestic sales, use and rental tax rates for one of zip code, geocode, and jurisdiction name; and a server having programming for determining all taxes due on each transaction request input to the apparatus according to the directory parameters maintained by the first, second and third databases; and wherein the sales and use tax computation module is operable to, search lines of the transactions to locate those transactions with exempt taxability codes associated with each of the lines of the transactions and a taxpayer invoiced tax amount of zero;

search the lines of the transactions to locate those transactions where all ship-to locations are within jurisdictions which do not impose sales or use taxes and with a taxpayer invoiced taxed amount of zero; and search the lines of the transactions to locate those transactions containing a trusted general ledger account for each ship-to state.

5. The system of claim 4, wherein the applications server in the network service module is operable to:

parse a first list in a selected first directory of the database for trusted vendors of the ship-to locations to determine whether a taxpayer of one of the transactions is a trusted vendor;

parse a second list in a selected second directory of the database for must-see accounts, cost centers, taxpayers and tax codes to determine whether the account number, cost center, taxpayer and tax code input with one of the transactions corresponds to a corresponding account number, cost center, taxpayer and tax code on the second list; and parse a third list in a selected third directory of the database to determine whether a tax rate corresponding to the tax amount invoiced matches an expected tax rate for the transaction request and is within a selected tolerance of error.

6. The system of claim 5, wherein the applications server in the network service module is further operable to:

search all lines of the transactions to determine if the expected tax rate for each line of the transactions is the full rate of tax for the corresponding ship-to location on the line, with a taxpayer invoiced tax amount equal to zero;

transmit the transactions to the sales and use tax computation module for reviewing the transactions and determining the amount of sales and/or use tax to be paid to or accrued by the taxpayer; and record in a general ledger system the tax paid to or accrued by the taxpayer.

7. A program controlled system for identifying taxable financial transactions, collecting data based on the transactions and calculating any taxes due on the transactions, the system comprising:

a first server for hosting a first virtual portal having at least one application for providing e-content to end users, the application including a network browser for accessing, displaying and transmitting data over a network;

a second server for hosting a second virtual portal having at least one application for receiving data from the first server and for parsing the data received;

a communications infrastructure linking the first and second servers to one another;

a third server for hosting a third virtual portal having at least one application for receiving data from the second server, parsing the data received for XML-based data and interpreting the XML-based data for selected data processing operations;

a network service module for processing XML-based data from the third server, the network service module including an applications server, a database, a sales and use tax computation module and a sales tax and use tax remittance module, the network service module receiving XML-based transactional data, storing the data in a first selected file of the database, computing the sales and use tax due on the corresponding transaction, storing the sales and use tax due in a second selected file of the database, converting the second file from an Extensible Markup Language (XML)-based format to a tax payment (TXP)-based format for receipt by an automated clearing house network, and periodically transmitting the second file through the network to a selected financial institution for electronic funds transfer to a selected government authority; and an infrastructure service module having a series of discrete operations including a security function for insuring system security over the network, a system recovery function, a system backup function, a real-time and continuous accessibility function, a system motoring function, a system load balancing function and a system scalability function;

wherein the sales and use tax computation module includes, a first database having a directory of parameters identifying all domestic taxing jurisdictions by one of zip code and jurisdiction name requiring payment of taxes;

a second database having a directory of parameters identifying the taxability of goods and/or services by each jurisdiction identified by one of zip code and jurisdiction name in the first database, through the use of commodity codes;

a third database having a directory of parameters identifying all domestic sales, use and rental tax rates for one of zip code and jurisdiction name; and a server having programming for determining all taxes due on each transaction request input to the apparatus according to the directory parameters maintained by the first, second and third databases;

further wherein the first server comprises an interface module for a merchant system, and the second server is included in a service provider system;

the first server is operable to electronically contact the second server in the service provider system each time an accounts payable source system transaction is initiated; and the sales and use tax computation module is operable to calculate one of an amount of sales or use tax to pay to the merchant's vendor and an amount of sales or use tax to accrue and report on behalf of the merchant for the initiated transaction.

8. The system of claim 7, wherein the sales tax and use tax remittance module is operable to automatically receive information on a consummation of the initiated transaction and effect a transfer of the amount of sales or use tax to accrue and report on behalf of the merchant to at least one account of a selected government authority.

9. The system of claim 7, wherein the sales and use tax remittance module is operable to automatically receive information on a consummation of the initiated transaction and effect a transfer of the amount of sales or use tax to pay to the merchant's vendor to an account of a selected financial institution.

10. The system of claim 7, further comprising:

a reporting/auditing module for generating interactive reports and for permitting auditing by the selected government authority; and a tax return module for automated generation of a tax return and transmitting the return electronically to the selected government authority.

11. A program controlled system for identifying taxable financial transactions, collecting data based on the transactions and calculating any taxes due on the transactions, the system comprising:

a first server for hosting a first virtual portal having at least one application for providing e-content to end users, the application including a network browser for accessing, displaying and transmitting data over a network;

a second server for hosting a second virtual portal having at least one application for receiving data from the first server and for parsing the data received;

a communications infrastructure linking the first and second servers to one another;

a third server for hosting a third virtual portal having at least one application for receiving data from the second server, parsing the data received for XML-based data and interpreting the XML-based data for selected data processing operations;

a network service module for processing XML-based data from the third server, the network service module including an applications server, a database, a sales and use tax computation module and a sales tax and use tax remittance module, the network service module receiving XML-based transactional data, storing the data in a first selected file of the database, computing the sales and use tax due on the corresponding transaction, storing the sales and use tax due in a second selected file of the database, converting the second file from an Extensible Markup Language (XML)-based format to a tax payment (TXP)-based format for receipt by an automated clearing house network, and periodically transmitting the second file through the network to a selected financial institution for electronic funds transfer to a selected government authority; and an infrastructure service module having a series of discrete operations including a security function for insuring system security over the network, a system recovery function, a system backup function, a real-time and continuous accessibility function, a system monitoring function, a system load balancing function and a system scalability function;

wherein the sales and use tax computation module includes, a first database having a directory of parameters identifying all domestic taxing jurisdictions by one of zip code and jurisdiction name requiring payment of taxes;

a second database having a directory of parameters identifying the taxability of goods and/or services by each jurisdiction identified by one of zip code and jurisdiction name in the first database, through the use of commodity codes;

a third database having a directory of parameters identifying all domestic sales, use and rental tax rates for one of zip code and jurisdiction name; and a server having programming for determining all taxes due on each transaction request input to the apparatus according to the directory parameters maintained by the first, second and third databases;

further wherein the sales and use tax computation module is operable to:

search lines of the transactions to locate those transactions with exempt taxability codes associated with each of the lines of the transactions and a taxpayer invoiced tax amount of zero;

search the lines of the transactions to locate those transactions where all ship-to locations are within jurisdictions which do not impose sales or use taxes and with a taxpayer invoiced taxed amount of zero; and search the lines of the transactions to locate those transactions containing a trusted general ledger account for each ship-to state.

12. The system of claim 11, wherein to applications server in the network service module is operable to:

parse a first list in a selected first directory of the database for trusted vendors of the ship-to locations to determine whether a taxpayer of one of the transactions is a trusted vendor;

parse a second list in a selected second directory of the database for must-see accounts, cost centers, taxpayers and tax codes to determine whether the account number, cost center, taxpayer and tax code input with one of the transactions corresponds to a corresponding account number, cost center, taxpayer and tax code on the second list; and parse a third list in a selected third directory of the database to determine whether a tax rate corresponding to the tax amount invoiced matches an expected tax rate for the transaction request and is within a selected tolerance of error.

13. The system of claim 11, wherein the applications server in the network service module is further operable to:

search all lines of the transactions to determine if the expected tax rate for each line of the transactions is to full rate of tax for the corresponding ship-to location on the line; with a taxpayer invoiced tax amount equal to zero;

transmit the transactions to the sales and use tax computation module for reviewing the transactions and determining the amount of sales and/or use tax to be paid to or accrued by the taxpayer; and record in a general ledger system the tax paid to or accrued by the taxpayer.

* * * * *

UNITED STATES PATENT AND TRADEMARK OFFICE
CERTIFICATE OF CORRECTION

PATENT NO. : 7,200,569 B2  Page 1 of 1
APPLICATION NO. : 09/995318
DATED : April 3, 2007
INVENTOR(S) : Robert J. Gallagher et al.

It is certified that error appears in the above-identified patent and that said Letters Patent is hereby corrected as shown below:

On the title page, item (75), in "Inventors", in column 1, lines 2-3, delete "Co. Spgs," and insert -- Colorado Springs --, therefor.

On the title page, item (75), in "Inventors", in column 1, line 5, delete "Arviso," and insert -- Arvizo, --, therefor, In column 23, line 67, delete "and/use" and insert -- and/or use --, therefor.

In column 25, line 12, in Claim 1, after "second" delete ",".

In column 27, line 46, in Claim 7, delete "motoring" and insert -- monitoring --, therefor.

In column 30, line 1, in Claim 12, delete "to" and insert -- the --, therefor.

In column 30, line 25, in Claim 13, delete "to" and insert -- the --, therefor.

In column 30, line 27, in Claim 13, delete "line;" and insert -- line, --, therefor.

Signed and Sealed this

Fifth Day of May, 2009

JOHN DOLL
*Acting Director of the United States Patent and Trademark Office*